United States Patent
Togawa

(10) Patent No.: US 11,214,250 B2
(45) Date of Patent: Jan. 4, 2022

(54) TRAVEL SUPPORT DEVICE AND NON-TRANSITORY COMPUTER-READABLE MEDIUM

(71) Applicant: ZENRIN CO., LTD., Kitakyushu (JP)

(72) Inventor: Hideyuki Togawa, Kitakyushu (JP)

(73) Assignee: ZENRIN CO., LTD., Kitakyushu (JP)

(*) Notice: Subject to any disclaimer, the term of this patent is extended or adjusted under 35 U.S.C. 154(b) by 58 days.

(21) Appl. No.: 16/579,868

(22) Filed: Sep. 24, 2019

(65) Prior Publication Data
US 2020/0017104 A1 Jan. 16, 2020

Related U.S. Application Data

(63) Continuation of application No. PCT/JP2018/006825, filed on Feb. 23, 2018.

(30) Foreign Application Priority Data

Apr. 27, 2017 (JP) .............................. JP2017-087801

(51) Int. Cl.
*B60W 30/12* (2020.01)
*G06K 9/00* (2006.01)

(52) U.S. Cl.
CPC ......... *B60W 30/12* (2013.01); *G06K 9/00798* (2013.01); *G06K 9/00818* (2013.01)

(58) Field of Classification Search
CPC ........... G06K 9/00798; G06K 9/00818; G06K 9/00791; G01C 21/32; B60W 2554/00; G08G 1/09623
See application file for complete search history.

(56) References Cited

U.S. PATENT DOCUMENTS

| 6,801,638 | B1 | 10/2004 | Janssen et al. |
| 7,058,206 | B1 | 6/2006 | Janssen et al. |
| 10,267,640 | B2 | 4/2019 | Asai |
| 2008/0147305 | A1 | 6/2008 | Kawamata et al. |
| 2010/0121569 | A1 | 5/2010 | Nakamura et al. |

(Continued)

FOREIGN PATENT DOCUMENTS

| JP | 05-052999 U | 7/1993 |
| JP | 09-051572 A | 2/1997 |

(Continued)

*Primary Examiner* — Kenneth J Malkowski
(74) *Attorney, Agent, or Firm* — Xsensus LLP

(57) ABSTRACT

A travel support device including a memory that stores section information including information on a position along a traveling direction of a lane and connection information, sign information indicating contents indicated by a sign, and related information including information associating the section information with the sign information, the related information further including specifying information and regulation information, and processing circuitry that specifies a current location of a vehicle using the sign information in response to determining that the specifying information indicates that the sign can be used to specify the position of the vehicle traveling at the predetermined point, and guides the vehicle using the sign information in response to determining that the regulation information indicates that the sign contents correspond to the regulation on the vehicle traveling at the predetermined point.

8 Claims, 30 Drawing Sheets

(56) References Cited

U.S. PATENT DOCUMENTS

| | | | |
|---|---|---|---|
| 2015/0069223 A1 | 3/2015 | Yoshimura | |
| 2015/0266471 A1* | 9/2015 | Ferguson | B25J 9/1697 701/23 |
| 2016/0104376 A1 | 4/2016 | Fowe et al. | |
| 2016/0275792 A1 | 9/2016 | Takiguchi et al. | |
| 2016/0275793 A1 | 9/2016 | Yokochi et al. | |
| 2017/0337849 A1 | 11/2017 | Matsumoto et al. | |
| 2018/0045516 A1 | 2/2018 | Sumizawa | |
| 2018/0189578 A1* | 7/2018 | Yang | G06K 9/4638 |
| 2018/0328742 A1 | 11/2018 | Asai | |
| 2019/0035110 A1 | 1/2019 | Shikimachi | |
| 2019/0078897 A1 | 3/2019 | Sumizawa | |

FOREIGN PATENT DOCUMENTS

| | | |
|---|---|---|
| JP | 2000-066619 A | 3/2000 |
| JP | 2001-318926 A | 11/2001 |
| JP | 2003-529043 A | 9/2003 |
| JP | 2007-171565 A | 7/2007 |
| JP | 2007-322283 A | 12/2007 |
| JP | 2008-145154 A | 6/2008 |
| JP | 2008-232821 A | 10/2008 |
| JP | 2008-293380 A | 12/2008 |
| JP | 2011-233151 A | 11/2011 |
| JP | 2014-157429 A | 8/2014 |
| JP | 2015-52496 A | 3/2015 |
| JP | 2016-125824 A | 7/2016 |
| JP | 2016-173221 A | 9/2016 |
| JP | 2016-173321 A | 9/2016 |
| JP | 2016-173338 A | 9/2016 |
| JP | 2016-176769 A | 10/2016 |
| JP | 2017-161501 A | 9/2017 |
| WO | 2017/037752 A1 | 3/2017 |
| WO | 2017/065182 A1 | 4/2017 |

\* cited by examiner

FIG. 3

LANE NETWORK INFORMATION 31

| | | | | |
|---|---|---|---|---|
| LL1 | IDENTIFICATION INFORMATION | LL1 | IDENTIFICATION INFORMATION | LL2 |
| | COORDINATE INFORMATION | (X11, Y11), (X12, Y12),··· | COORDINATE INFORMATION | (X21, Y21), (X22, Y22),··· |
| | EXIT SIDE IDENTIFICATION INFORMATION | LL3, LL4 | EXIT SIDE IDENTIFICATION INFORMATION | LL5 |
| | ENTRY SIDE IDENTIFICATION INFORMATION | LL | ENTRY SIDE IDENTIFICATION INFORMATION | LL |
| LL3 | IDENTIFICATION INFORMATION | LL3 | IDENTIFICATION INFORMATION | LL4 |
| | COORDINATE INFORMATION | (X31, Y31), (X32, Y32),··· | COORDINATE INFORMATION | (X41, Y41), (X42, Y42),··· |
| | EXIT SIDE IDENTIFICATION INFORMATION | LL6 | EXIT SIDE IDENTIFICATION INFORMATION | LL7 |
| | ENTRY SIDE IDENTIFICATION INFORMATION | LL1 | ENTRY SIDE IDENTIFICATION INFORMATION | LL1 |
| LL5 | IDENTIFICATION INFORMATION | LL5 | IDENTIFICATION INFORMATION | LL6 |
| | COORDINATE INFORMATION | (X51, Y51), (X52, Y52),··· | COORDINATE INFORMATION | (X61, Y61), (X62, Y62),··· |
| | EXIT SIDE IDENTIFICATION INFORMATION | LL8 | EXIT SIDE IDENTIFICATION INFORMATION | LL |
| | ENTRY SIDE IDENTIFICATION INFORMATION | LL2 | ENTRY SIDE IDENTIFICATION INFORMATION | LL3 |
| LL7 | IDENTIFICATION INFORMATION | LL7 | IDENTIFICATION INFORMATION | LL8 |
| | COORDINATE INFORMATION | (X71, Y71), (X72, Y72),··· | COORDINATE INFORMATION | (X81, Y81), (X82, Y82),··· |
| | EXIT SIDE IDENTIFICATION INFORMATION | LL | EXIT SIDE IDENTIFICATION INFORMATION | LL |
| | ENTRY SIDE IDENTIFICATION INFORMATION | LL4 | ENTRY SIDE IDENTIFICATION INFORMATION | LL5 |

(Right side labels: LL2, LL4, LL6, LL8)

FIG. 4A

FEATURE INFORMATION  32

| SIGN INFORMATION | |
|---|---|
| IDENTIFICATION INFORMATION | M1 |
| LOWER LEFT COORDINATE INFORMATION | (X301, Y301, Z301) |
| LOWER RIGHT COORDINATE INFORMATION | (X302, Y302, Z303) |
| SIGN HEIGHT INFORMATION | 0.8m |
| GROUND SURFACE HEIGHT INFORMATION | 2.5m |
| SIGN TYPE INFORMATION | REGULATION SIGN |
| VARIABLE TYPE SIGN INFORMATION | NOT VARIABLE TYPE SIGN |
| MAXIMUM SPEED VALUE INFORMATION | 50 |
| AUXILIARY SIGN INFORMATION | NONE |

FIG. 4B

RELATED INFORMATION 33

SIGN-RELATED INFORMATION R1

| IDENTIFICATION INFORMATION | R1 |
|---|---|
| IDENTIFICATION INFORMATION OF SECTION INFORMATION | LL6 |
| IDENTIFICATION INFORMATION OF SIGN INFORMATION | M1 |
| SPECIFYING INFORMATION | AVAILABLE |
| REGULATION INFORMATION | CORRESPONDING TO REGULATION |

SIGN-RELATED INFORMATION R2

| IDENTIFICATION INFORMATION | R2 |
|---|---|
| IDENTIFICATION INFORMATION OF SECTION INFORMATION | LL7 |
| IDENTIFICATION INFORMATION OF SIGN INFORMATION | M1 |
| SPECIFYING INFORMATION | AVAILABLE |
| REGULATION INFORMATION | NOT CORRESPONDING TO REGULATION |

SIGN-RELATED INFORMATION R3

| IDENTIFICATION INFORMATION | R3 |
|---|---|
| IDENTIFICATION INFORMATION OF SECTION INFORMATION | LL8 |
| IDENTIFICATION INFORMATION OF SIGN INFORMATION | M1 |
| SPECIFYING INFORMATION | AVAILABLE |
| REGULATION INFORMATION | NOT CORRESPONDING TO REGULATION |

FIG. 7

LANE NETWORK INFORMATION — 31

| | | | | |
|---|---|---|---|---|
| LL20 → | IDENTIFICATION INFORMATION | LL20 | IDENTIFICATION INFORMATION | LL21 | ← LL21
| | COORDINATE INFORMATION | (X13, Y13), (X14, Y14),··· | COORDINATE INFORMATION | (X23, Y23), (X24, Y24),··· |
| | EXIT SIDE IDENTIFICATION INFORMATION | LL26 | EXIT SIDE IDENTIFICATION INFORMATION | LL26 |
| | ENTRY SIDE IDENTIFICATION INFORMATION | LL32 | ENTRY SIDE IDENTIFICATION INFORMATION | LL33 |
| LL22 → | IDENTIFICATION INFORMATION | LL22 | IDENTIFICATION INFORMATION | LL23 | ← LL23
| | COORDINATE INFORMATION | (X33, Y33), (X34, Y34),··· | COORDINATE INFORMATION | (X43, Y43), (X44, Y44),··· |
| | EXIT SIDE IDENTIFICATION INFORMATION | LL27 | EXIT SIDE IDENTIFICATION INFORMATION | LL27 |
| | ENTRY SIDE IDENTIFICATION INFORMATION | LL32 | ENTRY SIDE IDENTIFICATION INFORMATION | LL33 |
| LL24 → | IDENTIFICATION INFORMATION | LL24 | IDENTIFICATION INFORMATION | LL25 | ← LL25
| | COORDINATE INFORMATION | (X53, Y53), (X54, Y54),··· | COORDINATE INFORMATION | (X63, Y63), (X64, Y64),··· |
| | EXIT SIDE IDENTIFICATION INFORMATION | LL28 | EXIT SIDE IDENTIFICATION INFORMATION | LL28 |
| | ENTRY SIDE IDENTIFICATION INFORMATION | LL32 | ENTRY SIDE IDENTIFICATION INFORMATION | LL33 |

| | | | | | |
|---|---|---|---|---|---|
| LL26 | IDENTIFICATION INFORMATION | LL26 | IDENTIFICATION INFORMATION | LL27 | LL27 |
| | COORDINATE INFORMATION | (X73, Y73), (X74, Y74),··· | COORDINATE INFORMATION | (X83, Y83), (X84, Y84),··· | |
| | EXIT SIDE IDENTIFICATION INFORMATION | LL29 | EXIT SIDE IDENTIFICATION INFORMATION | LL30 | |
| | ENTRY SIDE IDENTIFICATION INFORMATION | LL20, LL21 | ENTRY SIDE IDENTIFICATION INFORMATION | LL22, LL23 | |
| LL28 | IDENTIFICATION INFORMATION | LL28 | IDENTIFICATION INFORMATION | LL29 | LL29 |
| | COORDINATE INFORMATION | (X93, Y93), (X94, Y94),··· | COORDINATE INFORMATION | (X101, Y101), (X102, Y102),··· | |
| | EXIT SIDE IDENTIFICATION INFORMATION | LL31 | EXIT SIDE IDENTIFICATION INFORMATION | LL | |
| | ENTRY SIDE IDENTIFICATION INFORMATION | LL24, 25 | ENTRY SIDE IDENTIFICATION INFORMATION | LL26 | |
| LL30 | IDENTIFICATION INFORMATION | LL30 | IDENTIFICATION INFORMATION | LL31 | LL31 |
| | COORDINATE INFORMATION | (X111, Y111), (X112, Y112),··· | COORDINATE INFORMATION | (X121, Y121), (X122, Y122),··· | |
| | EXIT SIDE IDENTIFICATION INFORMATION | LL | EXIT SIDE IDENTIFICATION INFORMATION | LL | |
| | ENTRY SIDE IDENTIFICATION INFORMATION | LL27 | ENTRY SIDE IDENTIFICATION INFORMATION | LL28 | |
| LL32 | IDENTIFICATION INFORMATION | LL32 | IDENTIFICATION INFORMATION | LL33 | LL33 |
| | COORDINATE INFORMATION | (X131, Y131), (X132, Y132),··· | COORDINATE INFORMATION | (X141, Y141), (X142, Y142),··· | |
| | EXIT SIDE IDENTIFICATION INFORMATION | LL | EXIT SIDE IDENTIFICATION INFORMATION | LL21, LL23, LL25 | |
| | ENTRY SIDE IDENTIFICATION INFORMATION | LL20, LL22, LL24 | ENTRY SIDE IDENTIFICATION INFORMATION | LL21, LL23, LL25 | |

FIG. 8A

FEATURE INFORMATION     32

| SIGN INFORMATION | |
|---|---|
| IDENTIFICATION INFORMATION | M2 |
| LOWER LEFT COORDINATE INFORMATION | (X303, Y303, Z303) |
| LOWER RIGHT COORDINATE INFORMATION | (X304, Y304, Z304) |
| SIGN HEIGHT INFORMATION | 0.8m |
| GROUND SURFACE HEIGHT INFORMATION | 2.5m |
| SIGN TYPE INFORMATION | REGULATION SIGN |
| VARIABLE TYPE SIGN INFORMATION | NOT VARIABLE TYPE SIGN |
| MAXIMUM SPEED VALUE INFORMATION | 50 |
| AUXILIARY SIGN INFORMATION | NONE |

FIG. 8B

RELATED INFORMATION     33

| SIGN-RELATED INFORMATION | R4 | SIGN-RELATED INFORMATION | R5 |
|---|---|---|---|
| IDENTIFICATION INFORMATION | R4 | IDENTIFICATION INFORMATION | R5 |
| IDENTIFICATION INFORMATION OF SECTION INFORMATION | LL32 | IDENTIFICATION INFORMATION OF SECTION INFORMATION | LL33 |
| IDENTIFICATION INFORMATION OF SIGN INFORMATION | M2 | IDENTIFICATION INFORMATION OF SIGN INFORMATION | M2 |
| SPECIFYING INFORMATION | NOT AVAILABLE | SPECIFYING INFORMATION | NOT AVAILABLE |
| REGULATION INFORMATION | CORRESPONDING TO REGULATION | REGULATION INFORMATION | CORRESPONDING TO REGULATION |

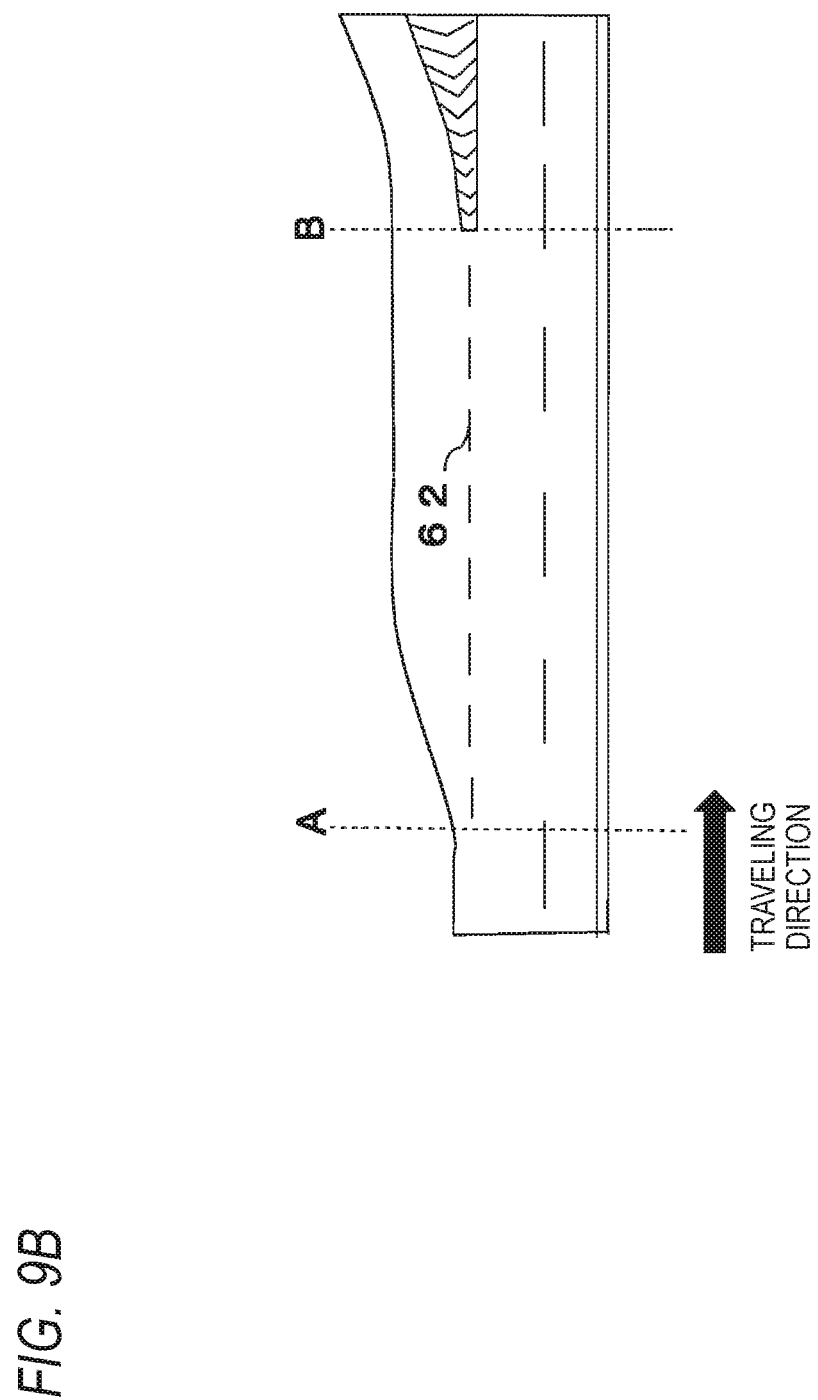

FIG. 10

LANE NETWORK INFORMATION 31

| | | | | |
|---|---|---|---|---|
| IDENTIFICATION INFORMATION | LL40 | IDENTIFICATION INFORMATION | LL41 | |
| COORDINATE INFORMATION | (X15, Y15), (X16, Y16),··· | COORDINATE INFORMATION | (X25, Y25), (X26, Y26),··· | |
| EXIT SIDE IDENTIFICATION INFORMATION | LL41 | EXIT SIDE IDENTIFICATION INFORMATION | LL42 | |
| ENTRY SIDE IDENTIFICATION INFORMATION | LL | ENTRY SIDE IDENTIFICATION INFORMATION | LL40 | |
| IDENTIFICATION INFORMATION | LL42 | IDENTIFICATION INFORMATION | LL43 | |
| COORDINATE INFORMATION | (X35, Y35), (X36, Y36),··· | COORDINATE INFORMATION | (X45, Y45), (X46, Y46),··· | |
| EXIT SIDE IDENTIFICATION INFORMATION | LL | EXIT SIDE IDENTIFICATION INFORMATION | LL44, LL46 | |
| ENTRY SIDE IDENTIFICATION INFORMATION | LL41 | ENTRY SIDE IDENTIFICATION INFORMATION | LL | |
| IDENTIFICATION INFORMATION | LL44 | IDENTIFICATION INFORMATION | LL45 | |
| COORDINATE INFORMATION | (X55, Y55), (X56, Y56),··· | COORDINATE INFORMATION | (X65, Y65), (X66, Y66),··· | |
| EXIT SIDE IDENTIFICATION INFORMATION | LL45 | EXIT SIDE IDENTIFICATION INFORMATION | LL | |
| ENTRY SIDE IDENTIFICATION INFORMATION | LL43 | ENTRY SIDE IDENTIFICATION INFORMATION | LL44 | |

| | | | | | |
|---|---|---|---|---|---|
| LL46 | IDENTIFICATION INFORMATION | LL46 | IDENTIFICATION INFORMATION | LL47 | LL47 |
| | COORDINATE INFORMATION | (X75, Y75), (X76, Y76),··· | COORDINATE INFORMATION | (X85, Y85), (X86, Y86),··· | |
| | EXIT SIDE IDENTIFICATION INFORMATION | LL47 | EXIT SIDE IDENTIFICATION INFORMATION | LL48 | |
| | ENTRY SIDE IDENTIFICATION INFORMATION | LL43 | ENTRY SIDE IDENTIFICATION INFORMATION | LL46 | |
| LL48 | IDENTIFICATION INFORMATION | LL48 | | | |
| | COORDINATE INFORMATION | (X95, Y95), (X96, Y96),··· | | | |
| | EXIT SIDE IDENTIFICATION INFORMATION | LL | | | |
| | ENTRY SIDE IDENTIFICATION INFORMATION | LL47 | | | |

*FIG. 11*

FEATURE INFORMATION    32

CL1

| IDENTIFICATION INFORMATION | CL1 |
|---|---|
| COORDINATE INFORMATION | (X311, Y311), (X312, Y312) |
| TYPE INFORMATION | WHITE SOLID LINE |
| VIRTUAL FLAG | NONE |

CL2

| IDENTIFICATION INFORMATION | CL2 |
|---|---|
| COORDINATE INFORMATION | (X313, Y313), (X314, Y314) |
| TYPE INFORMATION | WHITE BROKEN LINE |
| VIRTUAL FLAG | NONE |

CL3

| IDENTIFICATION INFORMATION | CL3 |
|---|---|
| COORDINATE INFORMATION | (X315, Y315), (X316, Y316) |
| TYPE INFORMATION | WHITE BROKEN LINE |
| VIRTUAL FLAG | NONE |

CL4

| IDENTIFICATION INFORMATION | CL4 |
|---|---|
| COORDINATE INFORMATION | (X317, Y317), (X318, Y318) |
| TYPE INFORMATION | WHITE BROKEN LINE |
| VIRTUAL FLAG | NONE |

CL5

| IDENTIFICATION INFORMATION | CL5 |
|---|---|
| COORDINATE INFORMATION | (X319, Y319), (X320, Y320) |
| TYPE INFORMATION | WHITE BROKEN LINE |
| VIRTUAL FLAG | NONE |

CL6

| IDENTIFICATION INFORMATION | CL6 |
|---|---|
| COORDINATE INFORMATION | (X321, Y321), (X322, Y322) |
| TYPE INFORMATION | WHITE SOLID LINE |
| VIRTUAL FLAG | NONE |

*FIG. 12*

RELATED INFORMATION 33

EDGE-LINE-RELATED INFORMATION

| R10 | | | R11 | |
|---|---|---|---|---|
| IDENTIFICATION INFORMATION | R10 | | IDENTIFICATION INFORMATION | R11 |
| IDENTIFICATION INFORMATION OF LANE SECTION INFORMATION | LL40 | | IDENTIFICATION INFORMATION OF LANE SECTION INFORMATION | LL41 |
| IDENTIFICATION INFORMATION OF EDGE LINE INFORMATION | RIGHT: CL1 LEFT: CL2 | | IDENTIFICATION INFORMATION OF EDGE LINE INFORMATION | RIGHT: CL1 LEFT: CL3 |

| R12 | | | R13 | |
|---|---|---|---|---|
| IDENTIFICATION INFORMATION | R12 | | IDENTIFICATION INFORMATION | R13 |
| IDENTIFICATION INFORMATION OF LANE SECTION INFORMATION | LL42 | | IDENTIFICATION INFORMATION OF LANE SECTION INFORMATION | LL43 |
| IDENTIFICATION INFORMATION OF EDGE LINE INFORMATION | RIGHT: CL1 LEFT: CL4 | | IDENTIFICATION INFORMATION OF EDGE LINE INFORMATION | RIGHT: CL2 LEFT: |

| R14 | | | R15 | |
|---|---|---|---|---|
| IDENTIFICATION INFORMATION | R14 | | IDENTIFICATION INFORMATION | R15 |
| IDENTIFICATION INFORMATION OF LANE SECTION INFORMATION | LL44 | | IDENTIFICATION INFORMATION OF LANE SECTION INFORMATION | LL45 |
| IDENTIFICATION INFORMATION OF EDGE LINE INFORMATION | RIGHT: CL3 LEFT: CL5 | | IDENTIFICATION INFORMATION OF EDGE LINE INFORMATION | RIGHT: CL4 LEFT: CL6 |

| | R16 | | | R17 |
|---|---|---|---|---|
| IDENTIFICATION INFORMATION | R16 | | IDENTIFICATION INFORMATION | R17 |
| IDENTIFICATION INFORMATION OF LANE SECTION INFORMATION | LL46 | | IDENTIFICATION INFORMATION OF FIRST SECTION INFORMATION | LL47 |
| IDENTIFICATION INFORMATION OF EDGE LINE INFORMATION | RIGHT: CL5 | | IDENTIFICATION INFORMATION OF SECOND SECTION INFORMATION | RIGHT: CL5 LEFT: |

| | R18 |
|---|---|
| IDENTIFICATION INFORMATION | R18 |
| IDENTIFICATION INFORMATION OF LANE SECTION INFORMATION | LL48 |
| IDENTIFICATION INFORMATION OF EDGE LINE INFORMATION | RIGHT: CL6 LEFT: |

*FIG. 15*

LANE NETWORK INFORMATION  31

| | | | | |
|---|---|---|---|---|
| IDENTIFICATION INFORMATION | LL50 | IDENTIFICATION INFORMATION | LL51 | |
| COORDINATE INFORMATION | (X17, Y17), (X18, Y18),··· | COORDINATE INFORMATION | (X27, Y27), (X28, Y28),··· | — LL51 |
| EXIT SIDE IDENTIFICATION INFORMATION | LL51 | EXIT SIDE IDENTIFICATION INFORMATION | LL52 | |
| ENTRY SIDE IDENTIFICATION INFORMATION | LL | ENTRY SIDE IDENTIFICATION INFORMATION | LL50 | |
| IDENTIFICATION INFORMATION | LL52 | IDENTIFICATION INFORMATION | LL53 | |
| COORDINATE INFORMATION | (X37, Y37), (X38, Y38),··· | COORDINATE INFORMATION | (X47, Y47), (X48, Y48),··· | — LL53 |
| EXIT SIDE IDENTIFICATION INFORMATION | LL | EXIT SIDE IDENTIFICATION INFORMATION | LL54, LL56 | |
| ENTRY SIDE IDENTIFICATION INFORMATION | LL51 | ENTRY SIDE IDENTIFICATION INFORMATION | LL | |
| IDENTIFICATION INFORMATION | LL54 | IDENTIFICATION INFORMATION | LL55 | |
| COORDINATE INFORMATION | (X57, Y57), (X58, Y58),··· | COORDINATE INFORMATION | (X67, Y67), (X68, Y68),··· | — LL55 |
| EXIT SIDE IDENTIFICATION INFORMATION | LL55 | EXIT SIDE IDENTIFICATION INFORMATION | LL | |
| ENTRY SIDE IDENTIFICATION INFORMATION | LL53 | ENTRY SIDE IDENTIFICATION INFORMATION | LL54 | |

LL50 marks row 1; LL52 marks row 5; LL54 marks row 9.

| | IDENTIFICATION INFORMATION | LL56 | | IDENTIFICATION INFORMATION | LL57 | |
|---|---|---|---|---|---|---|
| LL56 | COORDINATE INFORMATION | (X77, Y77), (X78, Y78),··· | | COORDINATE INFORMATION | (X87, Y87), (X88, Y88),··· | LL57 |
| | EXIT SIDE IDENTIFICATION INFORMATION | LL57 | | EXIT SIDE IDENTIFICATION INFORMATION | LL58 | |
| | ENTRY SIDE IDENTIFICATION INFORMATION | LL53 | | ENTRY SIDE IDENTIFICATION INFORMATION | LL56 | |
| | IDENTIFICATION INFORMATION | LL58 | | | | |
| LL58 | COORDINATE INFORMATION | (X97, Y97), (X98, Y98),··· | | | | |
| | EXIT SIDE IDENTIFICATION INFORMATION | LL | | | | |
| | ENTRY SIDE IDENTIFICATION INFORMATION | LL57 | | | | |

*FIG. 16*

FEATURE INFORMATION  32

CL11

| IDENTIFICATION INFORMATION | CL11 |
|---|---|
| COORDINATE INFORMATION | (X331, Y331), (X332, Y332) |
| TYPE INFORMATION | WHITE SOLID LINE |
| VIRTUAL FLAG | NONE |

CL12

| IDENTIFICATION INFORMATION | CL12 |
|---|---|
| COORDINATE INFORMATION | (X333, Y333), (X334, Y334) |
| TYPE INFORMATION | WHITE BROKEN LINE |
| VIRTUAL FLAG | NONE |

CL13

| IDENTIFICATION INFORMATION | CL13 |
|---|---|
| COORDINATE INFORMATION | (X335, Y335), (X336, Y336) |
| TYPE INFORMATION | WHITE BROKEN LINE |
| VIRTUAL FLAG | NONE |

CL14

| IDENTIFICATION INFORMATION | CL14 |
|---|---|
| COORDINATE INFORMATION | (X337, Y337), (X338, Y338) |
| TYPE INFORMATION | WHITE BROKEN LINE |
| VIRTUAL FLAG | NONE |

CL15

| IDENTIFICATION INFORMATION | CL15 |
|---|---|
| COORDINATE INFORMATION | (X339, Y339), (X340, Y340) |
| TYPE INFORMATION | |
| VIRTUAL FLAG | PRESENCE |

CL16

| IDENTIFICATION INFORMATION | CL16 |
|---|---|
| COORDINATE INFORMATION | (X341, Y341), (X342, Y342) |
| TYPE INFORMATION | WHITE SOLID LINE |
| VIRTUAL FLAG | NONE |

*FIG. 17*

RELATED INFORMATION    33

EDGE-LINE-RELATED INFORMATION

| R20 | | | R21 | |
|---|---|---|---|---|
| IDENTIFICATION INFORMATION | R20 | | IDENTIFICATION INFORMATION | R21 |
| IDENTIFICATION INFORMATION OF LANE SECTION INFORMATION | LL50 | | IDENTIFICATION INFORMATION OF LANE SECTION INFORMATION | LL51 |
| IDENTIFICATION INFORMATION OF EDGE LINE INFORMATION | RIGHT: CL11 LEFT: CL12 | | IDENTIFICATION INFORMATION OF EDGE LINE INFORMATION | RIGHT: CL11 LEFT: CL13 |

| R22 | | | R23 | |
|---|---|---|---|---|
| IDENTIFICATION INFORMATION | R22 | | IDENTIFICATION INFORMATION | R23 |
| IDENTIFICATION INFORMATION OF LANE SECTION INFORMATION | LL52 | | IDENTIFICATION INFORMATION OF LANE SECTION INFORMATION | LL53 |
| IDENTIFICATION INFORMATION OF EDGE LINE INFORMATION | RIGHT: CL11 LEFT: CL14 | | IDENTIFICATION INFORMATION OF EDGE LINE INFORMATION | RIGHT: CL12 LEFT: |

| R24 | | | R25 | |
|---|---|---|---|---|
| IDENTIFICATION INFORMATION | R24 | | IDENTIFICATION INFORMATION | R25 |
| IDENTIFICATION INFORMATION OF LANE SECTION INFORMATION | LL54 | | IDENTIFICATION INFORMATION OF LANE SECTION INFORMATION | LL55 |
| IDENTIFICATION INFORMATION OF EDGE LINE INFORMATION | RIGHT: CL13 LEFT: CL15 | | IDENTIFICATION INFORMATION OF EDGE LINE INFORMATION | RIGHT: CL14 LEFT: CL16 |

| IDENTIFICATION INFORMATION | R26 |
|---|---|
| IDENTIFICATION INFORMATION OF LANE SECTION INFORMATION | LL56 |
| IDENTIFICATION INFORMATION OF EDGE LINE INFORMATION | RIGHT: CL15 |

R26

| IDENTIFICATION INFORMATION | R27 |
|---|---|
| IDENTIFICATION INFORMATION OF FIRST SECTION INFORMATION | LL57 |
| IDENTIFICATION INFORMATION OF SECOND SECTION INFORMATION | RIGHT: CL15 LEFT: |

R27

| IDENTIFICATION INFORMATION | R28 |
|---|---|
| IDENTIFICATION INFORMATION OF LANE SECTION INFORMATION | LL58 |
| IDENTIFICATION INFORMATION OF EDGE LINE INFORMATION | RIGHT: CL16 LEFT: |

R28

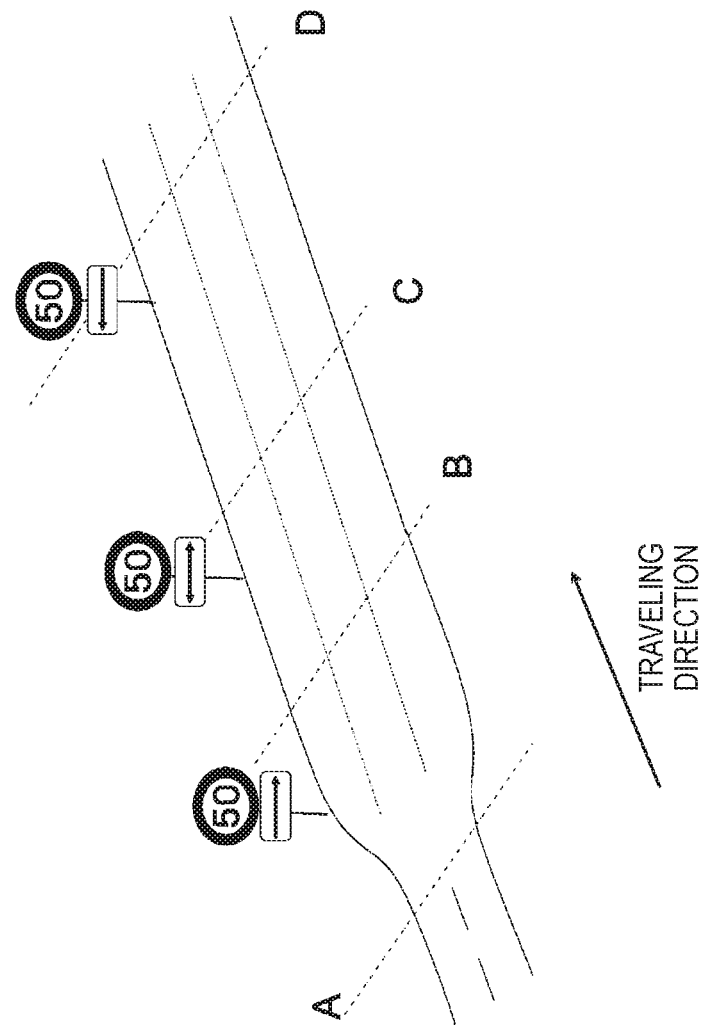

*FIG. 19*

FEATURE INFORMATION 32

| SIGN INFORMATION | |
|---|---|
| IDENTIFICATION INFORMATION | |
| LOWER LEFT COORDINATE INFORMATION | |
| LOWER RIGHT COORDINATE INFORMATION | |
| SIGN HEIGHT INFORMATION | |
| GROUND SURFACE HEIGHT INFORMATION | |
| SIGN TYPE INFORMATION | |
| VARIABLE TYPE SIGN INFORMATION | |
| MAXIMUM SPEED VALUE INFORMATION | |
| AUXILIARY SIGN INFORMATION | |

| SIGN TYPE INFORMATION | |
|---|---|
| GUIDE SIGN | INDICATE LOCATION NAME, DIRECTION NAME, DISTANCE, ETC. |
| WARNING SIGN | INDICATE ROAD HAZARDS AND CONDITIONS TO BE NOTED |
| REGULATION SIGN | INDICATE THAT NOTED TRAFFIC METHOD IS PROHIBITED OR INSTRUCTED |
| INSTRUCTION SIGN | INDICATE THAT NOTED TRAFFIC METHOD CAN BE DONE |
| ANOTHER SIGN | SHOW SIGNS OTHER THAN ABOVE |

| VARIABLE TYPE SIGN INFORMATION | | |
|---|---|---|
| VARIABLE TYPE SIGN | VARIABLE SIGNS WHERE SPEED VALUE CHANGES | |
| | VARIABLE SIGNS WHERE TYPE CHANGES | |
| NOT VARIABLE TYPE SIGN | | |

| AUXILIARY SIGN INFORMATION | |
|---|---|
| BEGINNING | INDICATE BEGINNING OF SECTION WHERE TRAFFIC REGULATION INDICATED BY SIGN IS PERFORMED |
| WITHIN SECTION | INDICATE THAT IT IS IN SECTION WHERE TRAFFIC REGULATION INDICATED BY SIGN IS PERFORMED |
| END | INDICATE END OF SECTION WHERE TRAFFIC REGULATION INDICATED BY SIGN IS PERFORMED |
| NONE | WHEN AUXILIARY SIGN IS NOT INSTALLED |
| UNKNOWN | WHEN IT IS POSSIBLE TO CONFIRM THAT AUXILIARY SIGN IS INSTALLED, BUT CONTENTS CANNOT BE READ |

TRAVEL SUPPORT DEVICE AND NON-TRANSITORY COMPUTER-READABLE MEDIUM

CROSS-REFERENCE TO RELATED APPLICATIONS

This application is a continuation of International Application No. PCT/JP2018/006825, filed Feb. 23, 2018, which claims priority from Japanese Application No. 2017-087801, filed Apr. 27, 2017, the entire contents of each are incorporated herein by reference.

TECHNICAL FIELD

The present disclosure relates to a technique capable of supporting travelling of a moving body.

BACKGROUND

In recent years, a device which accurately estimates a position of an own vehicle and supports driving of the vehicle has become popular. In connection to this, a technique has been proposed which is configured to include an imaging device mounted on the own vehicle and a feature information acquiring unit, to check an image obtained from the imaging device and feature information obtained from the feature information acquiring unit, and to determine a lane in which the own vehicle is present among a plurality of lanes (Patent Literature 1).

CITATION LIST

Patent Literature

[Patent Literature 1]: JP-A-2008-293380

SUMMARY

The present disclosure provides a travel support device which supports travel of a vehicle, comprising: a memory that stores section information constituting a part of information on a lane including information on a position along a traveling direction of a lane constituting a road and information indicating a connection of lanes, the section information including information on the position along the traveling direction of a predetermined section which is a part of the lane and information indicating a connection with a section adjacent to the predetermined section, sign information including information indicating contents indicated by a sign, and related information including information associating the section information with the sign information, the related information further including specifying information indicating whether the sign can be used to specify a position of a vehicle traveling at a predetermined point and regulation information indicating whether the contents indicated by the sign correspond to a regulation on the vehicle traveling at the predetermined point; and processing circuitry configured to specify a current location of the vehicle using the sign information in response to determining that the specifying information, included in the related information, indicates that the sign can be used to specify the position of the vehicle traveling at the predetermined point, and guide the vehicle using the sign information in response to determining that the regulation information, included in the related information, indicates that the contents indicated by the sign correspond to the regulation on the vehicle traveling at the predetermined point.

BRIEF DESCRIPTION OF DRAWINGS

FIG. 3 is a diagram for illustrating details of the data structure of the map data according to the first embodiment.

FIGS. 4A and 4B are diagrams for illustrating the details of the data structure of the map data according to the first embodiment.

FIG. 7 is a diagram for illustrating the details of the data structure of the map data according to the second embodiment.

FIGS. 8A and 8B are diagrams for illustrating the details of the data structure of the map data according to the second embodiment.

FIGS. 9A and 9B are diagrams for illustrating a concept of a data structure of map data according to the third embodiment.

FIG. 10 is a view for illustrating details of the data structure of the map data of the third embodiment.

FIG. 11 is a diagram for illustrating the details of the data structure of the map data according to the third embodiment.

FIG. 12 is a diagram for illustrating the details of the data structure of the map data according to the third embodiment.

FIG. 15 is a diagram for illustrating details of the data structure of the map data according to the fourth embodiment.

FIG. 16 is a diagram for illustrating the details of the data structure of the map data according to the fourth embodiment.

FIG. 17 is a diagram for illustrating the details of the data structure of the map data according to the fourth embodiment.

FIGS. 18A and 18B are diagrams for illustrating a concept of a data structure of map data 20 according to a modification example.

FIG. 19 is a diagram for illustrating details of the data structure of the map data 20 according to the modification example.

DETAILED DESCRIPTION

Technical Problem

Figure 1:
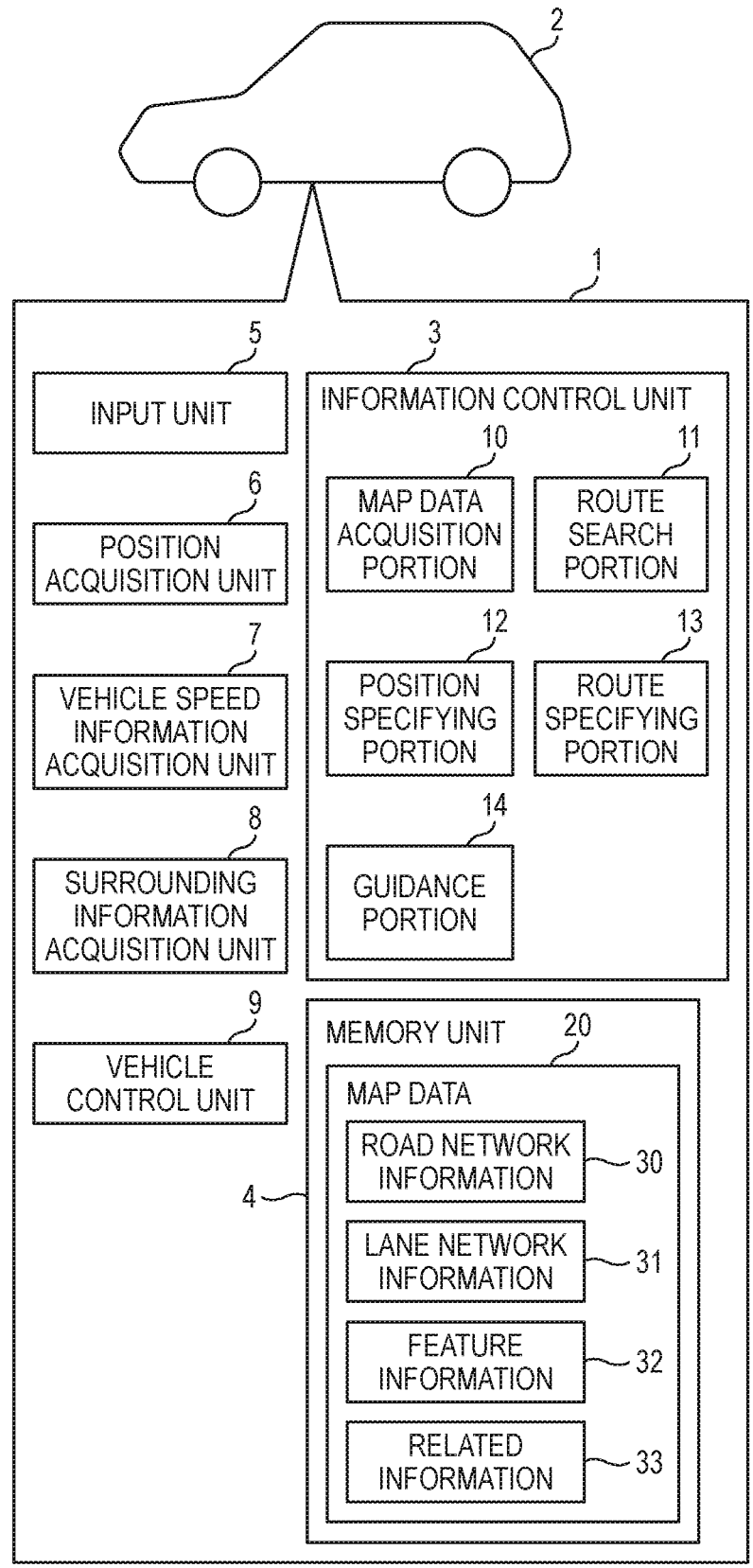
FIG. 1 is a diagram for illustrating a travel support system according to first to fourth embodiments.

An object of the disclosure is to provide a travel support device capable of appropriately guide-controlling a moving body and a data structure of map data used in the travel support device.

Solution to Problem (1) As an aspect of the disclosure, a travel support device which supports travel of a vehicle, includes: memory that stores section information constituting a part of information on a lane including information on a position along a traveling direction of a lane constituting a road and information indicating a connection of lanes, the section information including information on the position along the traveling direction of a predetermined section which is a part of the lane and information indicating a connection with a section adjacent to the predetermined section, sign information including information indicating contents indicated by a sign, and related information including information associating the section information with the sign information, the related information further including specifying information indicating whether the sign can be used to specify a position of a vehicle traveling at a predetermined point and regulation information indicating whether the contents indicated by the sign correspond to a regulation on the vehicle traveling at the predetermined point; and processing circuitry configured to specify a current location of the vehicle using the sign information in response to determining that the specifying information, included in the related information, indicates that the sign can be used to specify the position of the vehicle traveling at the predetermined point, and guide the vehicle using the sign information in response to determining that the regulation information, included in the related information, indicates that the contents indicated by the sign correspond to the regulation on the vehicle traveling at the predetermined point.

(2) As another aspect of the disclosure, the travel support device according to (1), wherein the sign information includes height information of the sign from a ground surface.

(3) As still another aspect of the disclosure, the travel support device according to (1), wherein the processing circuitry is configured to guide the vehicle by performing a drive assist.

(4) As still another aspect of the disclosure, the travel support device according to (1), wherein the processing circuitry is configured to determine whether the specifying information, included in the related information, indicates that the sign can be used to specify the position of the vehicle traveling at the predetermined point.

(5) As still another aspect of the disclosure, the travel support device according to (1), wherein the processing circuitry is configured to determine whether the regulation information, included in the related information, indicates that the contents indicated by the sign correspond to the regulation on the vehicle traveling at the predetermined point.

(6) As still another aspect of the disclosure, the travel support device according to (1), wherein the processing circuitry is configured to identify and store, in the memory, the section information which includes coordinate information corresponding to a point closest to a current location of the vehicle.

(7) As still another aspect of the disclosure, the travel support device according to (1), wherein the processing circuitry is configured to identify and store, in the memory, the sign information based on a current location of the vehicle.

(8) As still another aspect of the disclosure, the travel support device according to (1), wherein the sign information includes information indicating a shape of the sign.

(9) As still another aspect of the disclosure, the travel support device according to (8), wherein the processing circuitry is configured to: acquire, from an imaging device, a surrounding image of the vehicle; compare the acquired surrounding image with the shape of the sign indicated by the sign information to extract an image area of the sign.

(10) As still another aspect of the disclosure, the travel support device according to (9), wherein the processing circuitry is configured to specify the current location of the vehicle by calculating a relative distance between the vehicle and the sign based on the extracted image area of the sign.

(11) As an aspect of the disclosure, a travel support device which supports travel of a vehicle, includes: a memory that stores section information constituting a part of information on a lane including information on a position along a traveling direction of a lane constituting a road and information indicating a connection of lanes, the section information including information on the position along the traveling direction of a predetermined section which is a part of the lane and information indicating a connection with a section adjacent to the predetermined section, edge line information including information indicating a shape of an edge line, the edge line information further including virtual edge line information corresponding to a section where the edge line does not exist on an actual road, and related information including information associating the section information with the edge line information; and processing circuitry configured to: guide the vehicle using the virtual edge line information.

(12) As another aspect of the disclosure, the travel support device according to (11), wherein the processing circuitry is configured to guide the vehicle by performing a drive assist.

(13) As still another aspect of the disclosure, the travel support device according to (11), wherein the processing circuitry is configured to determine whether indication information indicates that the edge line information is the virtual edge line information.

(14) As still another aspect of the disclosure, the travel support device according to (11), wherein the processing circuitry is configured to: specify a current location of the vehicle without using the edge line information in response to determining that indication information indicates that the edge line information is the virtual edge line information, and specify the current location of the vehicle using the edge line information in response to determining that the indication information indicates that the edge line information is not the virtual edge line information.

(15) As an aspect of the disclosure, a non-transitory computer-readable medium having encoded thereon a data structure of map data, the data structure includes: section information constituting a part of information on a lane including information on a position along a traveling direction of a lane constituting a road and information indicating a connection of lanes, the section information including information on the position along the traveling direction of a predetermined section which is a part of the lane and information indicating a connection with a section adjacent to the predetermined section; edge line information including information indicating a shape of an edge line, the edge line information further including virtual edge line information corresponding to a section where the edge line does not exist on an actual road; and related information including information associating the section information with the edge line information, wherein the related information is used in a process in which processing circuitry acquires the edge line information related to the section information from a memory.

(16) As another aspect of the disclosure, the non-transitory computer-readable medium according to (15), wherein the edge line information is not used to specify a current location of a vehicle in a case where indication information indicates that the edge line information is the virtual edge line information, and the edge line information is used to specify the current location of the vehicle in a case where indication information indicates that the edge line information is not the virtual edge line information.

(17) As still another aspect of the disclosure, the non-transitory computer-readable medium according to (15), wherein the edge line information is used to guide a vehicle.

(18) As still another aspect of the disclosure, the non-transitory computer-readable medium according to (15), wherein the edge line information is used to guide a vehicle by performing a drive assist.

(19) As an aspect of the disclosure, a travel support device includes a memory unit which has: section information which is information constituting a part of information on a lane including information on a position along a traveling direction of a lane constituting a road and information indicating a connection of lanes and which includes information on the position along the traveling direction of a predetermined section which is a part of the lane and information indicating a connection with a section adjacent to the predetermined section; sign information including information indicating a shape of a sign and contents indicated by the sign; and related information including information associating the section information with the sign information, the related information includes information indicating whether the sign can be used to specify a position of a vehicle traveling at a predetermined point and information indicating whether the contents indicated by the sign correspond to a regulation on the vehicle traveling at the predetermined point, and the travel support device further includes a control unit which controls so as to specify a current location of the vehicle based on information indicating that the sign can be used to specify the position of the vehicle traveling at the predetermined point and to guide the vehicle based on information indicating that the contents indicated by the sign correspond to the regulation on the vehicle traveling at the predetermined point.

(20) According to another aspect, a data structure of map data includes: section information which is information constituting a part of information on a lane including information on a position along a traveling direction of a lane constituting a road and information indicating a connection of lanes and which includes information on the position along the traveling direction of a predetermined section which is a part of the lane and information indicating a connection with a section adjacent to the predetermined section; sign information including information indicating a shape of a sign and contents indicated by the sign; and related information including information associating the section information with the sign information, the related information includes information indicating whether the sign can be used to specify a position of a vehicle traveling at a predetermined point and information indicating whether the contents indicated by the sign correspond to a regulation on the vehicle traveling at the predetermined point and the related information is used in a process in which the control unit acquires the sign information related to the section information from a memory unit.

(21) According to still another aspect, in the data structure of data of (20), the sign information includes height information from a ground surface.

(22) According to still another aspect, a travel support device includes a memory unit which has: section information which is information constituting a part of information on a lane including information on a position along a traveling direction of a lane constituting a road and information indicating a connection of lanes and which includes information on the position along the traveling direction of a predetermined section which is a part of the lane and information indicating a connection with a section adjacent to the predetermined section, edge line information including information indicating a shape of an edge line; and related information including information associating the section information with the edge line information, the edge line information includes information indicating whether it is virtual edge line information corresponding to a section where the edge line does not exist on an actual road, and the travel support device further includes a control unit which controls not to use the edge line information to specify a current location of a vehicle but to use the edge line information to guide the vehicle based on information indicating that it is the virtual edge line information included in the edge line information, and controls to use the edge line information to specify the current location of the vehicle and to use the edge line information to guide the vehicle based on information indicating that it is not the virtual edge line information included in the edge line information.

(23) According to still another aspect, a data structure of map data includes: section information which is information constituting a part of information on a lane including information on a position along a traveling direction of a lane constituting a road and information indicating a connection of lanes and Which includes information on the position along the traveling direction of a predetermined section which is a part of the lane and information indicating a connection with a section adjacent to the predetermined section edge line information including information indicating a shape of an edge line; and related information including information associating the section information with the edge line information, the edge line information includes information indicating whether it is virtual edge line information corresponding to a section where the edge line does not exist on an actual road, and the related information is used in a process in which the control unit acquires the edge line information related to the section information from a memory unit.

FIG. 1 is a diagram for illustrating a travel support system 1 in first to fourth embodiments which is an example of a control system. The travel support system 1 is mounted on a vehicle 2 which is a moving body and includes an information control unit 3, a memory unit 4, an input unit 5, a position acquisition unit 6, a vehicle speed information acquisition unit 7, a surrounding information acquisition unit 8, and a vehicle control unit 9. The information control unit 3 includes functional portions for realizing predetermined functions, such as a map data acquisition portion 10, a route search portion 11, a position specifying portion 12, a route specifying portion 13, and a guidance portion 14 and includes a central processing unit (CPU), a read only memory (ROM), and a random access memory (RAM), which are not illustrated. The CPU of the information control unit 3 reads out various programs stored in the ROM, develops the programs in the RAM, and executes the programs to realize functions related to the various programs. The functional portions such as the map data acquisition portion 10, the route search portion 11, the position specifying portion 12, the route specifying portion 13, and the guidance portion 14 are functions realized by the programs.

The memory unit 4 is configured of a mass storage medium such as a hard disk or an SD-RAM. The memory unit 4 stores map data 20 used for route search processing, position specifying of the vehicle, vehicle guidance control, and the like. The map data 20 includes road network information 30, lane network information 31, feature information 32, and related information 33.

The road network information 30 has a plurality of pieces of location information including information on a specific point (for example, a fork of the road) of the road and a plurality of pieces of road section information including information on a predetermined section of the road and is information indicating a connection of roads by the plurality of pieces of location information and the plurality of pieces of road section information. The lane network information 31 is information constituting a part of information on the lane including information on the position of the lane constituting the road along a traveling direction and information indicating a connection of the lanes and is constituted of a plurality of pieces of lane section information including information on the position of a predetermined section which is a part of the lane along the traveling direction and information indicating a connection with a section adjacent to the predetermined section. The feature information 32 includes sign information indicating a sign present along the road, edge line information indicating a road edge line, and the like. The related information 33 is information for associating the lane section information of the lane network information 31 with the feature information, and specifically, the related information 33 includes a sign-related information which associates the lane section information with the sign information, an edge-line-related information Which associates the lane section information with the edge line information, and the like. Further, details of the lane section information, the feature information, and the related information will be described below.

The map data acquisition portion 10 extracts the desired map data 20 stored in the memory unit 4 in response to the map data acquisition request. The route search portion 11 executes a route search process using the road network information 30 stored in the memory unit 4. Specifically, the route search portion 11 uses the road section information and the location information included in the road network information 30 to execute a route search process from a departure point to a destination point. Then, route information indicating a route (a plurality of pieces of location information and a plurality of pieces of road section information connecting the departure point to the destination point) from the departure point to the destination point is created by the route search process. As a route search method, a well-known method such as Dijkstra's method is adopted and the shortest route from the departure point to the destination point is searched using the cost information included in the road section information.

The input unit 5 receives an instruction input for route setting and vehicle guidance from a user. The position acquisition unit 6 acquires position information on the position of the vehicle including latitude and longitude based on radio waves received from satellites constituting the Global Positioning System (GPS) and signals from gyros provided to the vehicle. The vehicle speed information acquisition unit 7 acquires information on the speed of the vehicle based on the pulse signal acquired from a vehicle speed sensor. The surrounding information acquisition unit 8 acquires surrounding information of the vehicle, which is image information of an object such as a sign around the vehicle and a road marking paint (for example, edge line). The position specifying portion 12 specifies where on the road the vehicle position is located from the position information acquired by the position acquisition unit 6 and specifies where on the road the vehicle position is located from the surrounding information acquired by the feature information 32 and the surrounding information acquisition unit 8.

The route specifying portion 13 performs a process for specifying a route to the lane network information 31 using the route information of the road network information 30 created by the route search portion 11. The embodiment described below is an example in which a vehicle travels the route specified in the lane network information 31 by the route specifying portion 13. The guidance portion 14 generates guidance information for the vehicle control unit to control the vehicle to move along a predetermined lane of the road and outputs the guidance information to the vehicle control unit 9. The vehicle control unit 9 controls (steering, acceleration and deceleration, stop, and the like) the vehicle to move along a predetermined lane of the road based on the guidance information.

Further, the travel support system 1 may be configured such that the information control unit 3 and the memory unit 4 are not installed in the vehicle 2 but installed in a server and the information control unit 3 in the server receives information of the input unit 5, the position acquisition unit 6, the vehicle speed information acquisition unit 7, and the surrounding information acquisition unit 8 as communication information and outputs the guidance information to the vehicle control unit 9 as communication information. In addition, the travel support system 1 may be configured such that the memory unit 4 is not installed in the vehicle 2 but installed in the server and the information control unit 3 in the vehicle extracts and receives the desired map data 20 stored in the memory unit 4 according to the communication information in response to the map data acquisition request.

First Embodiment

Figure 2A:
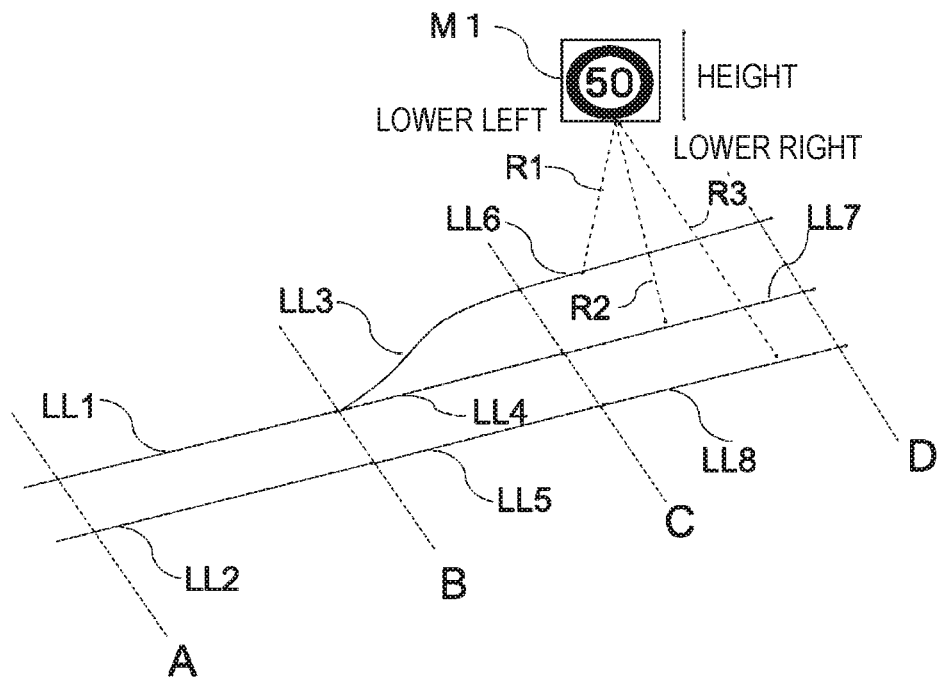
FIGS. 2A and 2B are diagrams for illustrating a concept of a data structure of map data according to the first embodiment.
Figure 2B:
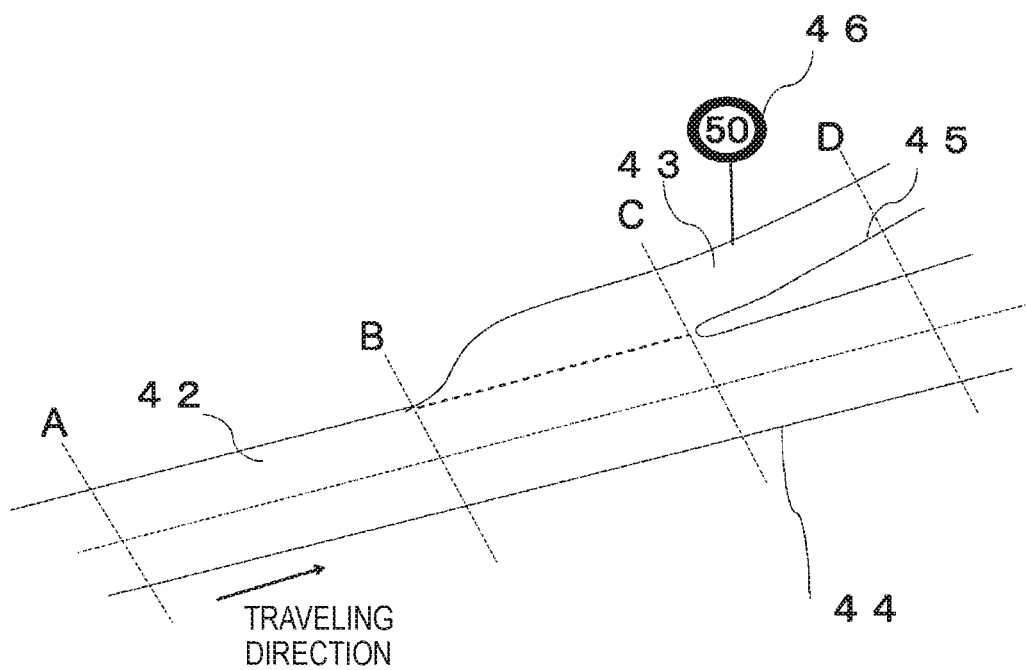

FIGS. 2A and 2B are diagrams for illustrating a concept of a data structure of the map data 20 of the embodiment. FIG. 2A is a conceptual diagram of the data structure of the map data 20, in which lane section information LL6 to LL8 and sign information M1 are associated by sign-related information R1 to R3. FIG. 2B is a diagram indicating an area around a fork of an actual expressway, in which, by increasing a lane for being forked so that the vehicle enters a forked road 43 from a point B of a straight road 42, the section from B to C is an area in which a lane for being forked and a lane for going straight exist in parallel. Also, a sign 46 indicating that the speed limit of the forked road is 50 km is installed along the forked road. 45 is a wall of the expressway at the fork of the straight road 42 and the forked road 43. LL1 to LL8 indicate lane section information. Further, the sign information M1 includes information indicating the shape of the sign and the contents indicated by the sign and has information indicating a polygon surrounding the sign as the shape of the sign. Here, the section from A to B, the section from B to C, and the section from C to D of the map data 20 respectively correspond to the section from A to B, the section from B to C, and the section from C to D of the actual road.

FIGS. 3 and 4 are diagrams for illustrating the details of the data structure of the map data 20 of the embodiment.

FIG. 3 is a diagram for illustrating the details of the lane section information LL1 to LL8 of the lane network information 31. Respective pieces of the lane section information LL1 to LL8 include identification information for identifying the lane section information LL1 to LL8, coordinate information indicating a series of coordinate points of a lane center line corresponding to the lane section information coordinate information LL1 to LL8, exit side identification information which is identification information of the lane section information corresponding to the sections on an exit side of the sections corresponding to the coordinate information of the lane section information LL1 to LL8, entry side identification information which is identification information of the lane section information corresponding to the sections on an entry side of the sections corresponding to the lane section information LL1 to LL8, and the like. Further, the coordinate information indicates a position along the traveling direction of the lanes constituting the road and the connection of the lanes is indicated by the exit side identification information and the entry side connection identification information. The lane section information LL1 to LL8 is information constituting a part of information on a lane including information on the position along the traveling direction of the lanes constituting the road and information indicating the connection of the lanes and is an example of section information including information on the position along the traveling direction of a predetermined section which is a part of the lane and information indicating the connection with a section adjacent to the predetermined section.

FIG. 4A is a diagram for illustrating the details of the sign information M1 of the feature information 32. The sign information includes identification information for identifying the sign information M1, lower left coordinate information which is coordinate information of a lower left vertex of a rectangle surrounding, the shape of sign as illustrated in FIG. 2A, lower right coordinate information which is coordinate information of a lower right vertex of the rectangle, sign height information which is length information from the bottom to the top of the rectangle, ground surface height information which is height information from the ground surface of the road of the sign corresponding to the sign information M1, sign type information indicating the type of sign corresponding to the sign information M1, variable type sign information indicating whether the sign corresponding to the sign information M1 is a variable type sign, maximum speed value information indicating the maximum speed of the sign corresponding to the sign information M, and auxiliary sign information indicating the contents of an auxiliary sign of the sign corresponding to the sign information M1. The sign information M1 is sign information including the information indicating the shape of the sign and the contents indicated by the sign and is an example including the information of the height from the ground surface.

FIG. 4B is a diagram for illustrating the details of the sign-related information of the related information 33. The sign-related information R1 to R3 includes identification information to identify the sign-related information, identification information of lane section information to identify the lane section information, identification information of sign information to identify the sign information, specifying information indicating whether the sign 46 can be used to specify the position of a vehicle traveling in the section from B to C of the road illustrated in FIG. 2B, and regulation information indicating whether the sign 46 falls under the regulation on a vehicle traveling in the section from C to D of the road 43 and a vehicle traveling in the section from C to D of the road 42. The sign-related information R1 is an example of the related information including information for associating section information with sign information, information indicating whether the sign can be used to specify the position of a vehicle traveling at a predetermined point, information indicating whether the contents indicated by the sign correspond to the regulation on the vehicle traveling at the predetermined point. Since the sign 46 can be used for position-specifying for a vehicle traveling on any lane of the section from B to C of the road illustrated in FIG. 2B, each of pieces of the specifying information of the sign-related information R1 to R3 has the information of "available". The contents indicated by the sign 46 corresponds to the regulation on a vehicle traveling in the section from C to D of the road 43 and not to the regulation on a vehicle traveling on the section from C to D of the road 42. Therefore, the regulation information of the sign-related information R1 has the information of "corresponding to regulation" and each of pieces of the sign-related information R2 and R3 has the information of "not corresponding to regulation".

Figure 5:
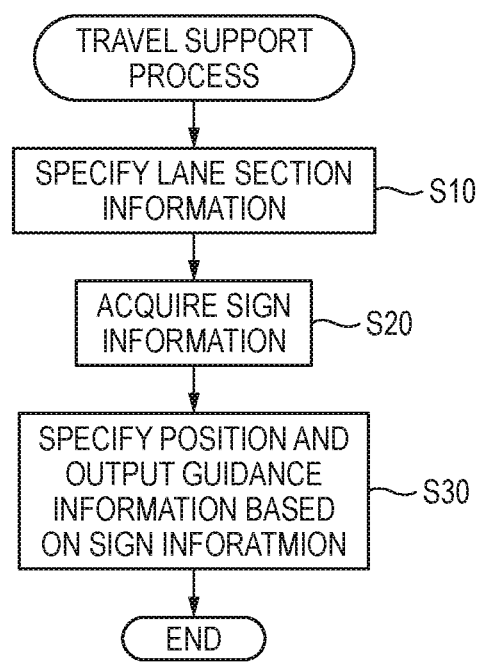
FIG. 5 is a diagram for illustrating an operation flow of a travel support process of the first embodiment.

FIG. 5 is a diagram for illustrating an operation flow of a travel support process of the first embodiment.

The information control unit 3 performs a specifying process of lane section information, a sign information acquisition process, and a position specifying process and a guidance information output process based on the sign information. The specifying process of lane section information, the sign information acquisition process, and the position specifying process and the guidance information output process based on the sign information will be specifically described below.

The information control unit 3 performs the following process as specifying process of the lane section information.

The lane section information which includes the coordinate information corresponding to the point closest to the current location of the vehicle is specified. In this case, in position-specifying of the current location of the vehicle, the coordinates of the current location of the vehicle is calculated using the actual road edge line acquired by the surrounding information acquisition unit 8, surrounding image information of the vehicle such as a sign, edge line information stored in the memory unit 4, feature information 32 such as the sign information, and the like (Step S10).

The information control unit 3 (map data acquisition portion 10) performs the following process as the sign information acquisition process.

When the coordinate information corresponding to the point closest to the current location of the vehicle is included in the lane section information LL6, the sign information M1 associated with the lane section information LL6 is specified by using the sign related information R1. In addition, when the coordinate information corresponding to the point closest to the current location of the vehicle is included in the lane section information LL7, the sign information M1 associated with the lane section information LL6 is specified by using the sign related information R2 (Step S20). This process specifies the sign information in the lane section information. This process is an example in which related information is used for a process where the control unit acquires the sign information related to the section information from the memory unit.

The information control unit 3 (position specifying portion 12, guidance portion 14) performs the following process as the position specifying and guidance information output process based on the sign information.

While the vehicle is traveling on the section from C to D of the road 43 or the section from C to D of the road 42, the surrounding information acquisition unit 8 is controlled to acquire the surrounding image of the vehicle. Then, the specifying information "available" included in the sign information M1 specified in Step S10 is specified and the acquired surrounding image is compared (image-matched)

with the shape based on the lower left coordinate information, the lower right coordinate information, and the sign height information included in the sign information M1 specified in Step S10. When the image area of the sign 46 is extracted from the surrounding image as a result of comparison, the relative distance between the vehicle and the sign 46 is calculated from the position of the image area of the sign 46 in the surrounding image, and the position of the sign 46 is specified from the lower left coordinate information, the lower right coordinate information, and the sign height information included in the sign information M1, to calculate the current position of the vehicle from the relative distance and the position of the sign 46. This process is an example of a process of controlling to use the sign information to specify the current location of the vehicle based on the information indicating that the sign can be used to specify the position of the vehicle traveling at a predetermined point.

While the vehicle is traveling on the section from C to D of the road 43, the regulation information "corresponding to regulation" is specified from the sign-related information R1 acquired by the sign information acquisition process and the guidance information is generated so that the vehicle travels along the series of coordinate points included in the lane section information LL6 at 50 km, which is the maximum speed information of the sign information M1, and then the guidance information is output to the vehicle control unit 9 (Step S30). This process is an example of guiding the vehicle based on the information indicating that the contents indicated by the sign correspond to the regulation on the vehicle traveling at the predetermined point.

On the other hand, while the vehicle is traveling on the section from C to D of the road 43, the regulation information of the sign related information acquired by the sign information acquisition process is "not corresponding to regulation", guidance information to run the vehicle based on the maximum speed information of the sign information M1 is not generated.

Second Embodiment

Figure 6A:
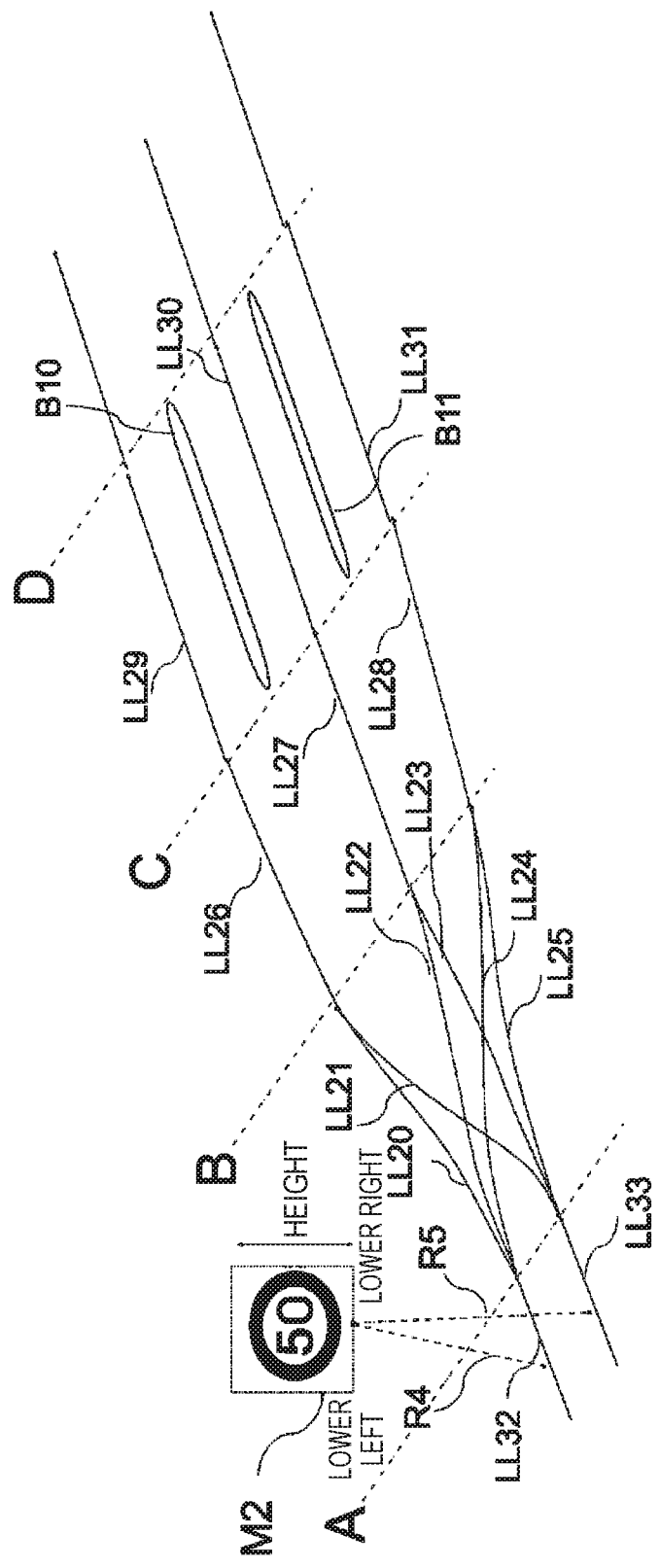
FIGS. 6A and 6B are diagrams for illustrating a concept of a data structure of map data according to the second embodiment.
Figure 6B:
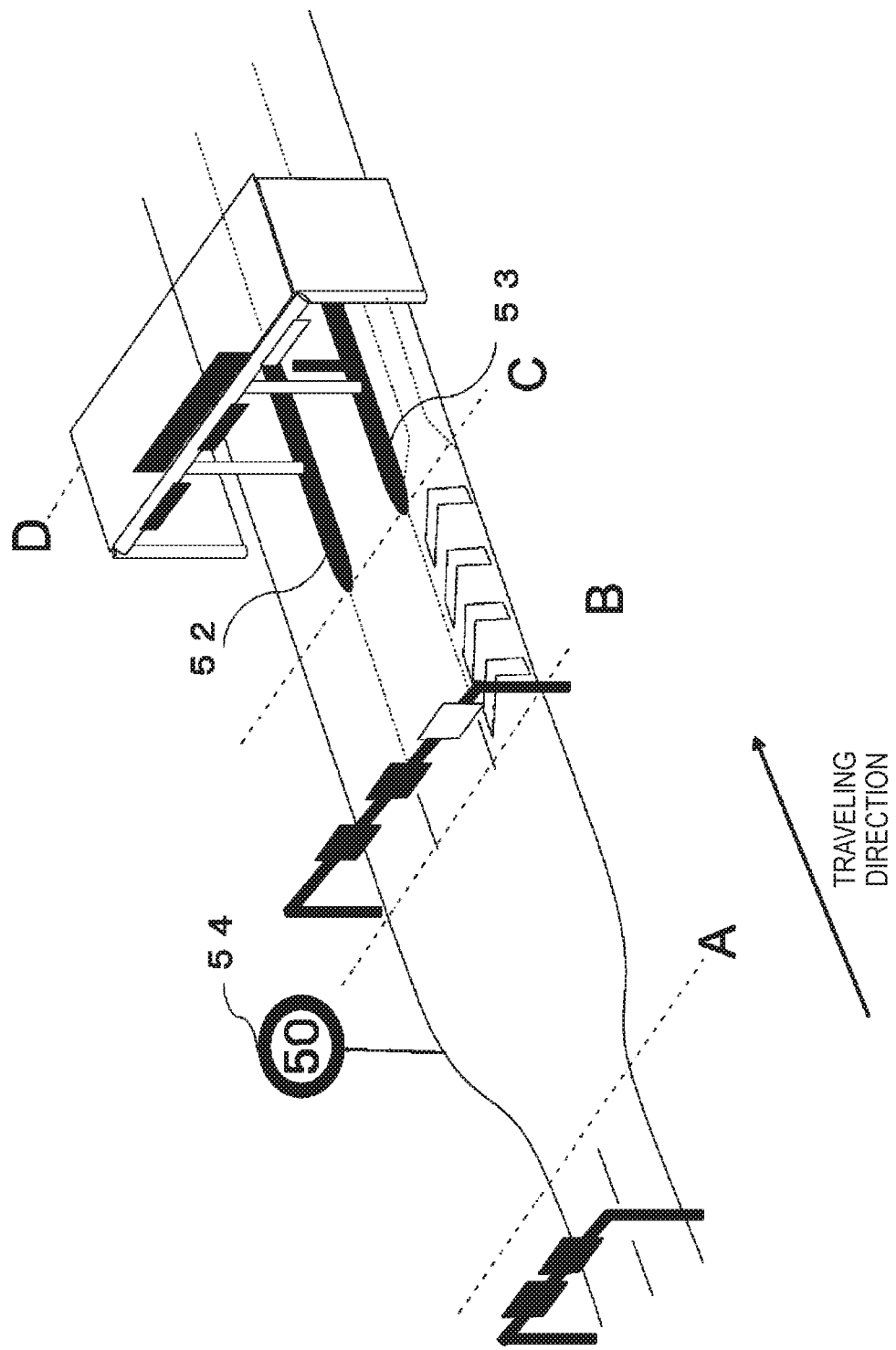

FIGS. 6A and 6B are diagrams for illustrating a concept of a data structure of the map data 20 of the embodiment. FIG. 6A is a conceptual diagram of the data structure of the map data 20, which is a structure in which the lane network information 31 and the sign information M2 are associated by the sign-related information. FIG. 6B is a diagram illustrating an area around a tollgate of an actual expressway. A section from A to B is a section in which the road width is gradually expanded from the two-lane road to the three-lane tollgate and a sign 54 indicating that the speed limit is 50 km is installed in the middle of the section from A to B. In this case, a section to A, the section from A to B, a section from B to C, a section from C to D, and a section after D of the map data 20 respectively correspond to a section to A, a section from A to B, a section from B to C, a section from C to D, and a section after D of an actual road.

LL20 to LL33 indicate lane section information. The section from B to D has the lane section information LL26 to LL31 for three lanes respectively corresponding to the lanes at the tollgate. Since the section from A to B is a non-lane section where a vehicle is accessible to any of the three gates of the tollgate, in order to indicate the connection from each of the two lanes on the entry side to each of the lanes in the gates of the tollgate, the lane section information LL20, LL22, and LL24 indicating the connection from the lane section information LL32 to each of pieces of the lane section information LL26 to LL28 and the lane section information LL21, LL23, and LL25 indicating the connection from the lane section information LL33 to each of pieces of the lane section information LL26 to LL28 are included, B10 and B11 include area information corresponding to areas B10 and B11 existing between the lanes in the tollgate.

The sign information M2 includes the information indicating the shape of the sign 54 and the contents indicated by the sign and has the information indicating a polygon surrounding the sign as the shape of the sign. The lane section information LL32 is associated with sign information M2 by related information R4 and the lane section information LL33 is associated with the sign information M2 by related information R5.

FIGS. 7, 8A and 8B are diagrams for illustrating details of a data structure of the map data 20 of the embodiment.

FIG. 7 is a diagram for illustrating the details of the lane section information LL20 to LL33 of the lane network information 31 and the specific configuration thereof is the same as that of FIG. 3 described in the first embodiment.

FIG. 8A is a diagram for illustrating details of the sign information M2 of the feature information 32 and the specific configuration thereof is the same as that of FIG. 4A described in the first embodiment.

FIG. 8B is a diagram for illustrating details of sign related information R4 and R5 of the related information 33 and the specific configuration thereof is the same as that of FIG. 4B described in the first embodiment. The sign 54 cannot be used for position-specifying because it is difficult for a vehicle traveling around a point A to obtain an image of the sign 54, and thus each of pieces of the specifying information of the sign-related information R4 and R5 has information of "unavailable". In addition, the contents indicated by the sign 54 correspond to the regulation on a vehicle traveling in the section from B to C of the road illustrated in FIG. 6B, and thus the regulation information of the sign-related information R4 and R5 has information of "corresponding to regulation".

Next, an operation flow of the travel support process of the second embodiment will be described with reference to FIG. 5.

The information control unit 3 performs a specifying process of lane section information, a sign information acquisition process, and a position specifying process and a guidance information output process based on the sign information. The specifying process of lane section information, the sign information acquisition process, and the position specifying process and the guidance information output process based on the sign information will be specifically described below.

The information control unit 3 (position specifying portion 12) performs the following process as the specifying process of lane section information.

The lane section information which includes the coordinate information corresponding to the point closest to the current location of the vehicle is specified. In this case, the position-specifying of the current location of the vehicle may be configured such that the coordinates of the current location of the vehicle is calculated using the actual road edge line acquired by the surrounding information acquisition unit 8, surrounding image information of the vehicle such as a sign, edge line information stored in the memory unit 4, feature information 32 such as the sign, and the like (Step S10).

The information control unit 3 (map data acquisition portion 10) performs the following process as the sign information acquisition process.

When the lane section information LL32 includes the coordinate information corresponding to the point closest to the current location of the vehicle, the sign information M2 associated with the lane section information LL32 is specified using the related information 33 including the sign-related information R4 (Step S20). This process specifies the sign information in the lane section information.

The information control unit 3 (position specifying portion 12, guidance portion 14) performs the following process as the position specifying and guidance information output process based on the sign information.

The regulation information "corresponding to regulation" is specified from the sign-related information R4 acquired by the sign information acquisition process and the guidance information is generated so that the vehicle travels along the series of coordinate points included in the lane section information LL20 to LL25 at 50 km, which is the maximum speed information of the sign information M2, and then the guidance information is output to the vehicle control unit 9 (Step S30).

On the other hand, since the specifying information of the sign-related information acquired by the sign information acquisition process is "unavailable", the control to specify the current position of the vehicle using the sign information M2 is not performed.

Third Embodiment

Figure 9A:
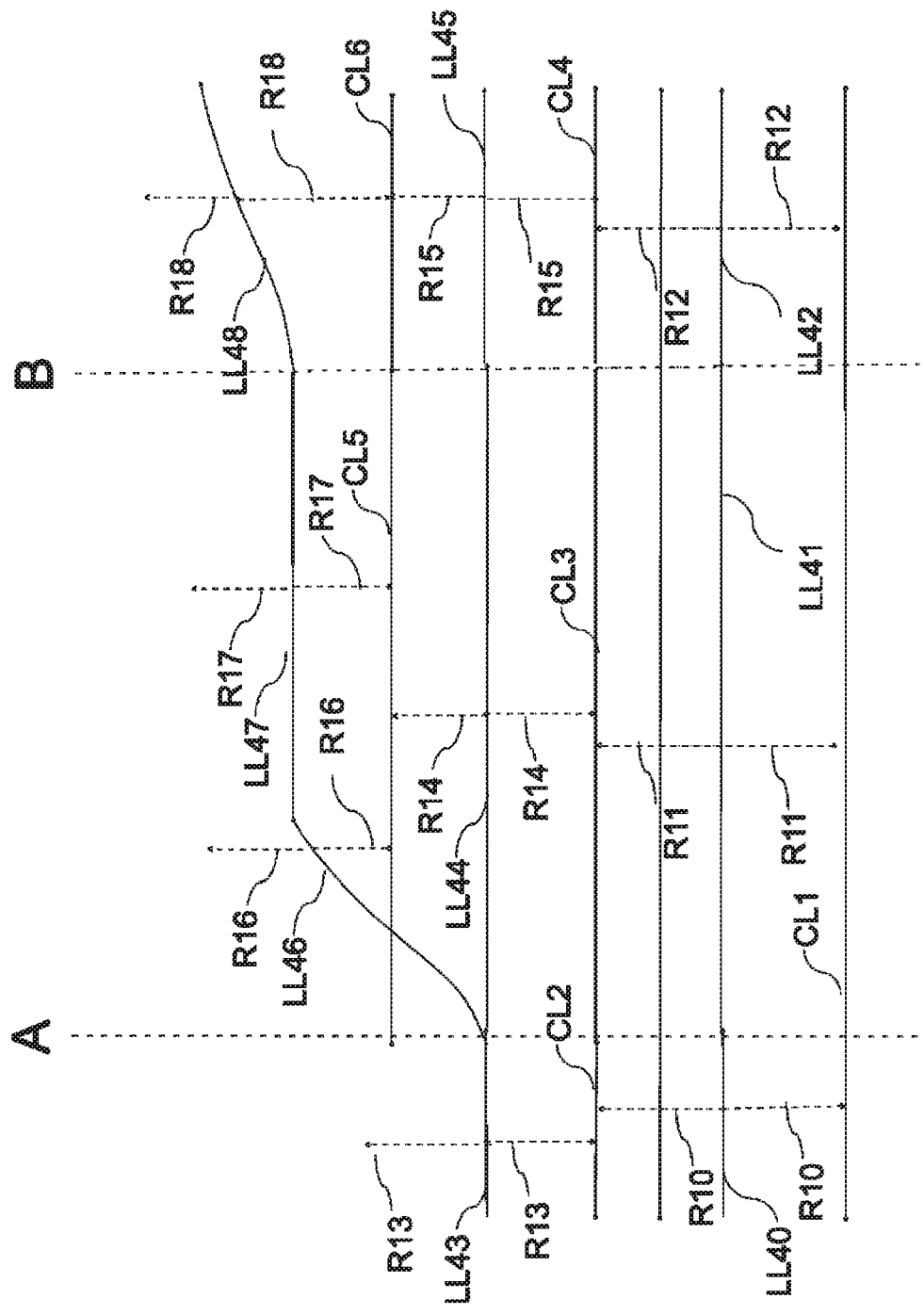

FIGS. 9A and 9B are diagrams for illustrating a concept of a data structure of the map data 20 of the embodiment. FIG. 9A is a conceptual diagram of the data structure of the map data 20, which is a structure in which lane network information 31 and edge line information are associated by edge-line-related information. FIG. 9B is a diagram illustrating an actual expressway, and in which a lane for being forked to allow a vehicle to enter a forked road is added. A section to A, a section from A to B, and a section after B of the map data 20 respectively correspond to a section to A, a section from A to B, and a section after B of the actual road.

LL40 to LL48 are lane section information, CL1 to CL6 are edge line information, and R10 to R18 are edge-line-related information which associates the lane section information LL40 to LL48 with the edge line information CL1 to CL6. The lane edge line information LL40 is associated with the edge line information CL1 and CL2 by the edge-line-related information R10. Similarly, the lane edge line information LL41 is associated with the edge line information CL1 and CL3 by the edge-line-related information R11. The lane edge line information LL42 is associated with the edge line information CL1 and CL4 by the edge-line-related information R12. The lane edge line information LL43 is associated with the edge line information CL2 by the edge-line-related information R13. The lane edge line information LL44 is associated with the edge line information CL3 and CL5 by the edge-line-related information R14. The lane edge line information LL45 is associated with the edge line information CL4 and CL6 by the edge-line-related information R15. The lane edge line information LL46 is associated with the edge line information CL5 by the edge-line-related information R16. The lane section edge line information LL47 is associated with the edge line information CL5 by the edge-line-related information R17. The lane edge line information LL48 is associated with the edge line information CL6 by the edge-line-related information R18. The edge-line-related information CL1 to CL6 is an example of related information including information associating the lane section information and the edge line information.

The edge line information CL1 corresponds to an edge line (white solid line, right side with respect to the traveling direction) on the actual road and the edge line information CL2 to CL4 correspond to edge lines (white broken lines, central side with respect to the traveling direction) on the actual road, and further the edge line information CL5 corresponds to an edge line (white broken line, left side with respect to the traveling direction) on the actual road, and still further the edge line information CL6 corresponds to an edge line (white solid line, left side with respect to the traveling direction) on the actual road. The edge line information CL1 is an example of information indicating the shape of the edge line.

FIGS. 10 to 12 are diagrams for illustrating details of a data structure of the map data 20 of the embodiment.

FIG. 10 is a diagram for illustrating details of the lane section information LL40 to LL48 of the lane network information 31 and the specific configuration thereof is the same as that of FIG. 3 described in the first embodiment.

FIG. 11 is a diagram for illustrating details of the edge line information CL1 to CL6 of the feature information 32. Each of pieces of the edge line information CL1 to CL6 includes identification information to identify the edge line information, coordinate information indicating a series of coordinate points of the center line of the edge line in a predetermined section corresponding to the edge line information, type information indicating the type of the edge line, and a virtual flag indicating whether the edge line information is virtual edge line information corresponding to a section where the edge line does not exist on the actual road. Further, the coordinate information is an example of information indicating the shape of edge line and the virtual flag is an example of information indicating whether it is virtual edge line information corresponding to a section where the edge line does not exist on the actual road.

FIG. 12 is a diagram for illustrating details of edge-line-related information R10 to R18 of the related information 33. Each of pieces of the edge-line-related information R10 to R18 includes identification information for identifying the edge line related information. The edge-line-related information R10 includes the identification information of the lane section information LL40 and the identification information of the edge line information CL1 and CL2 to indicate that the lane section information LL40 and the edge line information CL1 on the right side of the traveling direction and the edge line information CL2 on the left side of the traveling direction are associated. Similarly, the edge-line-related information R11 includes the identification information of the lane section information LL41 and the identification information of the edge line information CL1 and CL3 to indicate that the lane section information LL41 and the edge line information CL1 on the right side of the traveling direction and the edge line information CL3 on the left side of the traveling direction are associated. The edge line related information R12 includes the identification information of the lane section information LL42 and the identification information of the edge line information CL1 and CL4 to indicate that the lane section information LL42 and the edge line information CL1 on the right side of the traveling direction and the edge line information CL4 on the left side of the traveling direction are associated. The edge line related information R13 includes the identification information of the lane section information LL43 and the identification information of the edge line information CL2 to indicate that the lane section information LL43 and the edge line information CL2 on the right side of the traveling direction are associated. The edge line related information R14 includes the identification information of the lane section information LL44 and the identification information of the edge line information CL3 and CL5 to indicate that the lane section information LL44 and the edge line information CL3 on the right side of the traveling direction and the edge line information CL5 on the left side of the traveling direction are associated. The edge line related information R15 includes the identification information of the lane section information LL45 and the identification information of the edge line information CL4 and CL6 to indicate that the lane section information LL45 and the edge line information CL4 on the right side of the traveling direction and the edge line information CL6 on the left side of the traveling direction are associated. The edge line related information R16 includes the identification information of the lane section information LL46 and the identification information of the edge line information CL5 to indicate that the lane section information LL46 and the edge line information CL5 on the right side of the traveling direction are associated. The edge line related information R17 includes the identification information of the lane section information LL47 and the identification information of the edge line information CL5 to indicate that the lane section information LL47 and the edge line information CL5 on the right side of the traveling direction are associated. The edge line related information R18 includes the identification information of the lane section information LL42 and the identification information of the edge line information CL6 to indicate that the lane section information LL48 and the edge line information CL6 on the right side of the traveling direction are associated.

Figure 13:
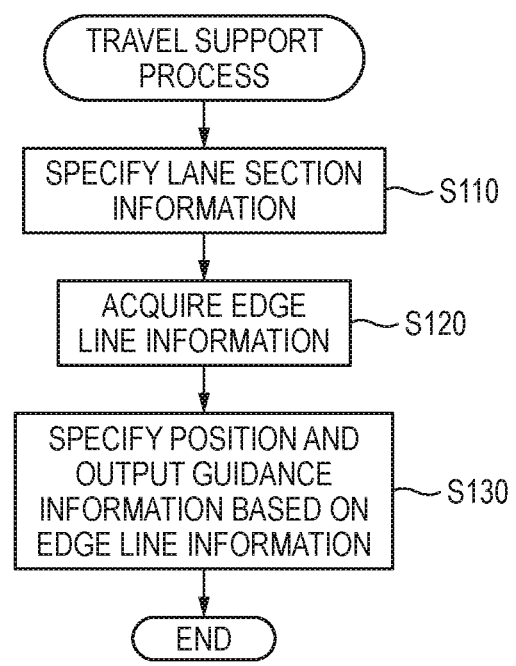
FIG. 13 is a diagram for illustrating an operation flow of a travel support process of the third embodiment.

FIG. 13 is a diagram for illustrating an operation flow of a travel support process of the third embodiment.

The information control unit 3 performs a specifying process of lane section information, an edge line information acquisition process, and a position specifying process and a guidance information output process based on the edge line information. The specifying process of lane section information, the edge line information acquisition process, and the position specifying process and the guidance information output process based on the edge line information will be specifically described below.

The information control unit 3 (position specifying portion 12) performs the following process as the lane section information specifying process.

The lane section information which includes the coordinate information corresponding to the point closest to the current location of the vehicle is specified. Further, it may be configured such that the position corresponding to the current location information acquired by the position acquisition unit 6 is used as the current location or it may be configured so as to calculate the coordinates of the current location of the vehicle using the surrounding image information of the vehicle such as the edge line of the actual road acquired by the surrounding information acquisition unit 8, the feature information 32 such as the edge line information stored in the memory unit 4, and the like (Step S110).

The information control unit 3 (map data acquisition portion 10) performs the following process as the edge line information acquisition process.

When the lane section information LL44 includes the coordinate information corresponding to the point closest to the current location of the vehicle, the edge line information CL3 and CL5 associated with the lane section information LL44 is specified by using the related information 33 including the edge-line-related information R14 (Step S120). By the process described above, the edge line information associated with the lane section information is specified. The process described above is an example used for the process in which the control unit acquires the edge line information associated the section information from the memory unit.

The information control unit 3 (guidance portion 14) performs the following processes as the position specifying process and the guidance information output process.

(1) The edge line information CL3 acquired by the edge line information acquisition process described above is specified and information which specifies the current location of the vehicle as the point associated with the edge line information CL3 is generated, and then the information is output to the vehicle control unit 9. Further, the guidance information which causes vehicle to travel in the traveling direction along the series of coordinate points of the edge line information CL3 is generated and the guidance information is output to the vehicle control unit 9 (Step S130).

(2) The edge line information CL5 acquired by the edge line information acquisition process described above is specified and information specifying the current location of the vehicle as the point associated with the edge line information CL5 is generated, and then the information is output to the vehicle control unit 9. Further, guidance information which causes the vehicle to travel in the traveling direction along the series of coordinate points of the edge line information CL5 is generated and the guidance information is output to the vehicle control unit 9 (Step S130).

(3) The surrounding information acquisition unit 8 is controlled to acquire the surrounding image of the vehicle. Then, the virtual flag "none" included in the edge line information CL5 specified in Step S120 is specified and the acquired surrounding image is compared (image-matched) with the shape by the series of the coordinate points by the coordinate information included in the edge line information CL5 specified in Step S120. When the image area of the edge line 62 is extracted from the surrounding image as a result of comparison, by specifying the position of the sign 26 from the coordinate information included in the edge line information CL5, the current position of the vehicle is calculated from a relative distance between the vehicle and the edge line 62, which is derived from a mounting angle of the surrounding information acquisition unit 8 and a distance from the ground surface and the position of the sign 46. The processes of (1), (2), and (3) described above are an example of control to use the edge line information to guide the vehicle, and to use the edge line information to specify the current location of the vehicle based on information indicating that it is not information of a virtual edge line included in the edge line information.

Fourth Embodiment

Figure 14A:
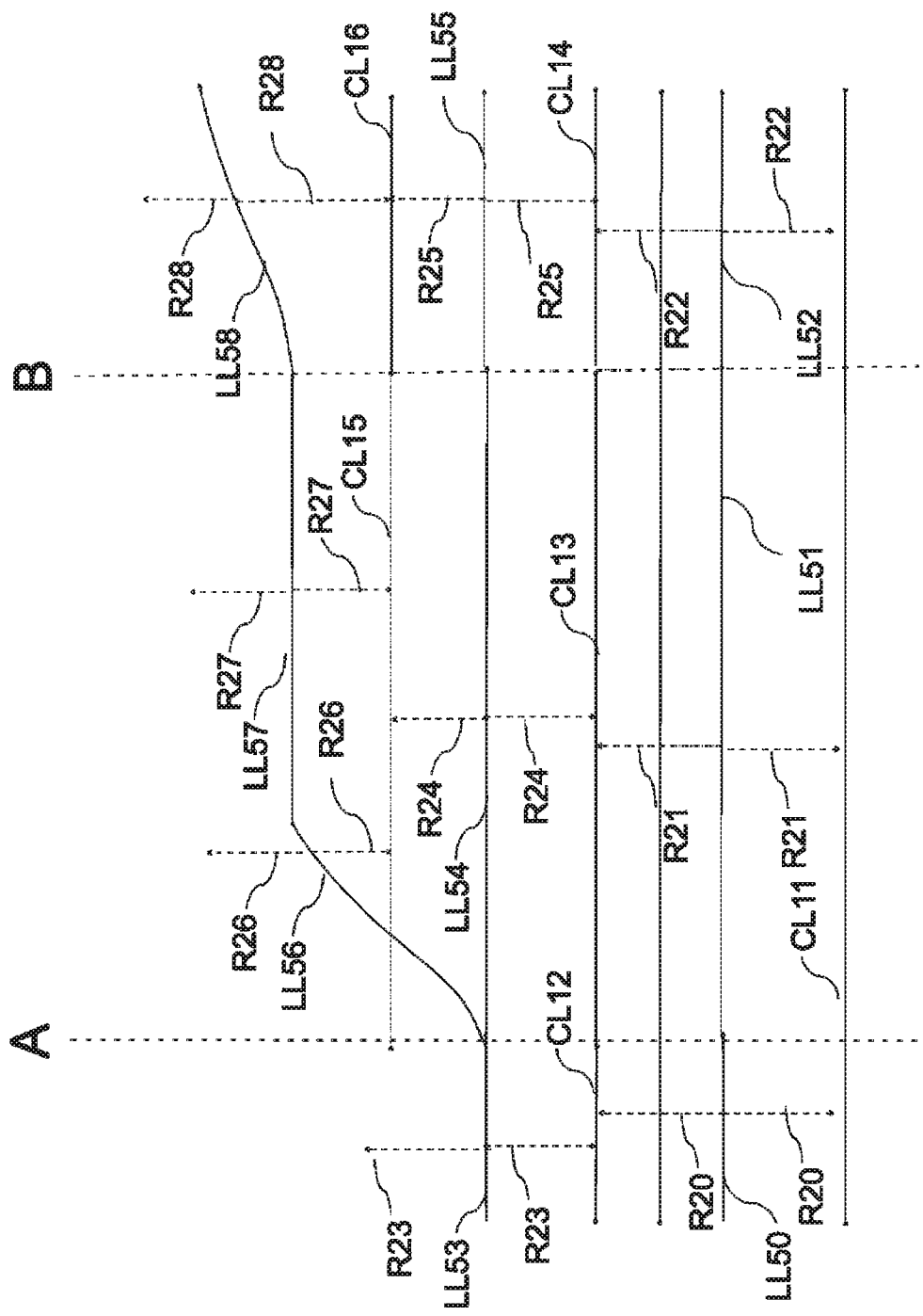
FIGS. 14A and 14B are diagrams for illustrating a concept of a data structure of map data according to the fourth embodiment.
Figure 14B:
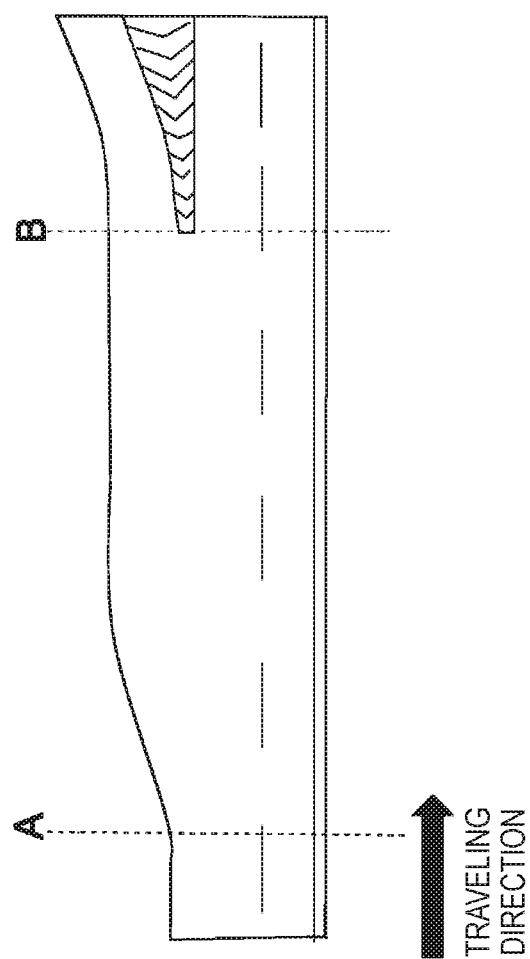

FIGS. 14A and 14B are diagrams for illustrating a concept of a data structure of the map data 20 of the fourth embodiment. FIG. 14A is a conceptual diagram of the data structure of the map data 20, which is a structure in which the lane network information 31 and edge line information are associated by edge-line-related information. FIG. 14B is a diagram illustrating an actual expressway. A section to A, a section from A to B, and a section after B of the map data 20 respectively correspond to a section to A, a section from A to B, a section after B of an actual road.

LL50 to LL58 are lane section information and CL11 to CL16 are edge line information, and further R20 to R28 are edge-line-related information which associates the lane section information LL50 to LL58 with the edge line information CL11 to CL16. The lane edge line information LL50 is associated with the edge line information CL11 and CL12 by the edge line related information R20. Similarly, the lane edge line information LL51 is associated with the edge line information CL11 and CL13 by the edge line related information R21. The lane edge line information LL52 is associated with the edge line information CL11 and CL14 by the edge line related information R22. The lane edge line information LL53 is associated with the edge line information CL12 by the edge line related information R23. The lane edge line information LL54 is associated with the edge line information CL13 and CL15 by the edge line related information R24. The lane edge line information LL55 is associated with the edge line information CL14 and CL16 by the edge line related information R25. The lane edge line information LL56 is associated with the edge line information CL15 by the edge line related information R26. The lane edge line information LL57 is associated with the edge line information CL15 by the edge line related information R27. The lane edge line information LL58 is associated with the edge line information CL16 by the edge line related information R28. The edge-line-related information CL11 to CL16 is an example of related information including information for associating the lane section information with the edge line information.

The edge line information CL11 corresponds to the edge line (white solid line) on an actual road and the edge line information CL12 to CL14 corresponds to the edge line (white broken line) on the actual road, and further the edge line information CL16 corresponds to the edge line (white solid line) on the actual road. The edge line information CL15 is an example of information of the virtual edge line corresponding to a section where an edge line does not exist on the actual road.

FIGS. 15 to 17 are diagrams for illustrating details of a data structure of the map data 20 of the embodiment.

FIG. 15 is a diagram for illustrating details of the lane section information LL50 to LL58 of the lane network information 31 and the specific configuration thereof is the same as that of FIG. 3 described in the first embodiment.

FIG. 16 is a diagram for illustrating details of the edge line information CL11 to CL16 of the feature information 32 and the specific configuration thereof is the same as that of FIG. 12 described in the third embodiment. There is no edge line at a point corresponding to the actual road, which is the point corresponding to the edge line information CL15. Therefore, the virtual flag of the edge line information CL15 has information of "presence".

FIG. 17 is a diagram for illustrating details of the edge-line-related information R20 to R28 of the related information 33 and the specific configuration thereof is the same as that of FIG. 13 described in the third embodiment.

Next, an operation flow of a travel support process of the fourth embodiment will be described with reference to FIG. 13.

The information control unit 3 performs a specifying process of lane section information, an edge line information acquisition process, a position specifying process, and a guidance information output process. The specifying process of lane section information, the edge line information acquisition process, the position specifying process, and the guidance information output process will be specifically described below.

The information control unit 3 (position specifying portion 12) performs the following process as the specifying process of lane section information.

It is specified using the lane section information which includes the coordinate information corresponding to the point closest to the current location of the vehicle. Further, it may be configured such that the position corresponding to the current location information acquired by the position acquisition unit 6 is used as the current location or it may be configured so as to calculate the coordinates of the current location of the vehicle using the surrounding image information of the vehicle such as the edge line of the actual road acquired by the surrounding information acquisition unit 8, the feature information 32 such as the edge line information stored in the memory unit 4, and the like (Step S110).

The information control unit 3 (map data acquisition portion 10) performs the following process as the edge line information acquisition process.

When the lane section information LL54 includes the coordinate information corresponding to the point closest to the current location of the vehicle, the edge line information CL13 and CL15 associated with the lane section information LL54 is specified by using the related information 33 including the edge-line-related information R24 (Step S120). By the process described above, the edge line information related to the lane section information is specified.

The information control unit 3 (guidance portion 14) performs the following processes as the position specifying process and the guidance information output process.

(1) The virtual flag "none" of the edge line information CL13 is specified from the edge-line-related information R24 acquired by the edge line information acquisition process described above and information which specifies the current location of the vehicle as a point associated with the edge line information CL13, and then the information is output to the vehicle control unit 9. Further, guidance information is generated which causes the vehicle to travel in the traveling direction along the series of coordinate points of the edge line information CL13 and the guidance information is output to the vehicle control unit 9 (Step S130).

(2) The edge line information CL15 acquired by the edge line information acquisition process described above is specified and the guidance information for causing the vehicle to travel in the traveling direction along the series of coordinate points of the edge line information CL15, and then the guidance information is output to the vehicle control unit 9. On the other hand, when the virtual flag "presence" of the edge line information CL15 acquired by the edge line information acquisition process is specified, the edge line information CL15 is not used to specify the current location of the vehicle (Step S130). This process is an example of controlling not to use the edge line information to specify the current location of the vehicle based on the information indicating that the information is the virtual edge line included in the edge line information while using the edge line information to guide the vehicle.

Modification Example

The disclosure is not limited to the embodiments described above and can be implemented in various modes in a range without departing from the gist of the disclosure. For example, the following modifications are possible.

In the embodiments described above, an example of guiding the vehicle based on the sign information is described. In addition to this, the sign information may include more detailed information.

Figure 18A:
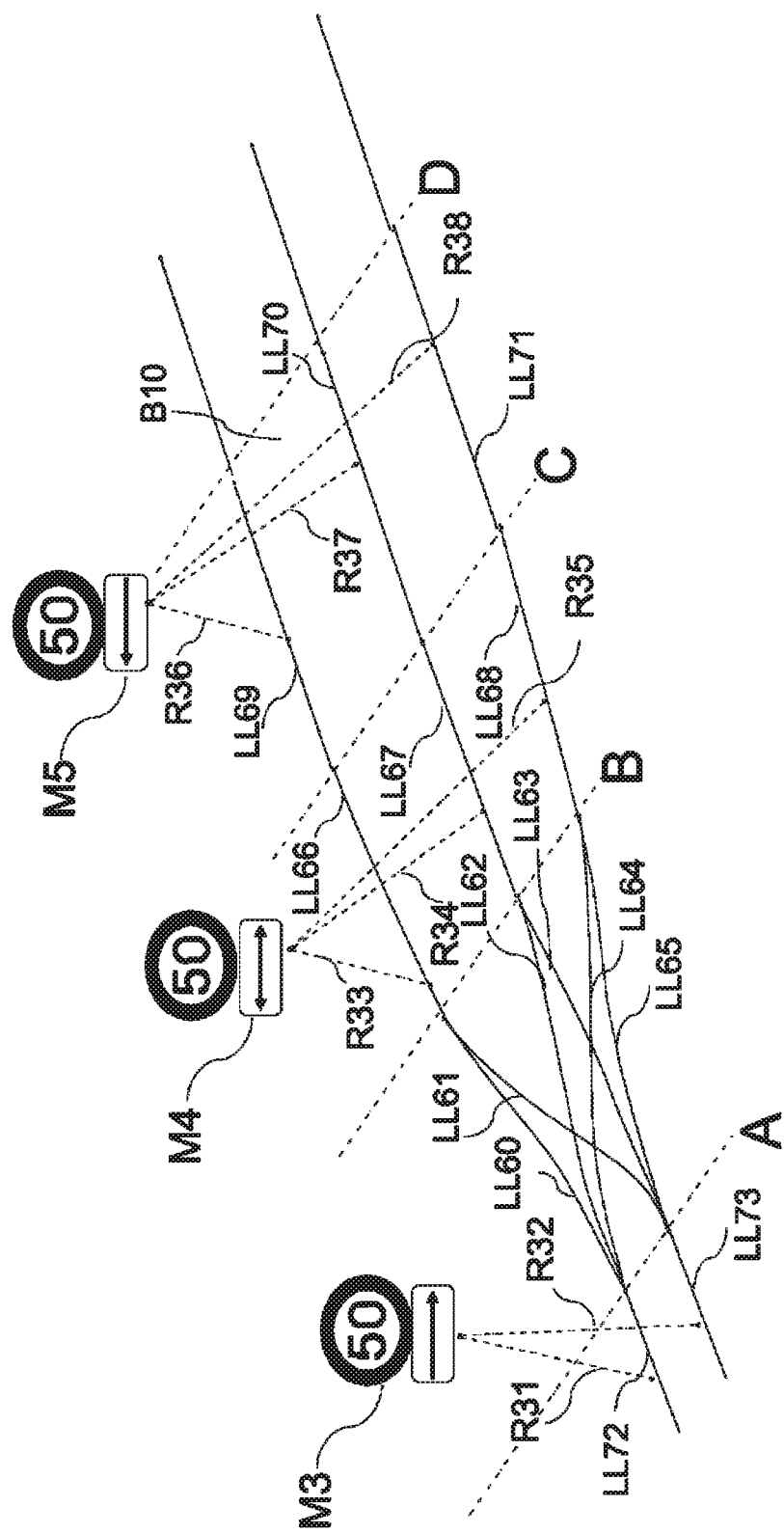

FIGS. 18A and 18B are diagrams for illustrating a concept of a data structure of the map data 20 of the modification example, FIG. 18A is a conceptual diagram of the data structure of the map data 20, which is a structure in which the lane network information 31 and the sign information M3, M4, and M5 are associated by the sign-related information. FIG. 18B is a diagram illustrating an actual expressway. LL60 to LL73 indicate lane section information. Further, the sign information M3, M4, and M5 includes information indicating the shape of the sign and the contents indicated by the sign and each of pieces of the sign information M3, M4, and M5 has regulation information "corresponding to regulation". Auxiliary sign information of the sign information M3 has "beginning" information which indicates the beginning of the section indicated by the regulation sign and auxiliary sign information of the sign information M4 has "within section" which indicates that it is within the section indicated by the regulation sign, and further auxiliary sign information of the sign information M5 has "end" information which indicates the end of the section indicated by the regulation sign. Here, a section from A to B, a section from B to C, and a section from C to D of the map data 20 respectively correspond to a section from A to B, a section from B to C, and a section from C to D of an actual road.

FIG. 19 is a diagram for illustrating details of the sign information of the feature information 32. As the sign type information, one among a guide sign, a warning sign, a regulation sign, an instruction sign, and another sign is included according to the type of the sign corresponding to the sign information. Variable type sign information includes either variable type sign or non-variable type sign. The auxiliary sign information includes one among beginning, within section, end, none, and unknown.

The information control unit 3 (guidance portion 14) performs the following process as the guidance information output process based on the sign information.

(1) The regulation information "corresponding to regulation" of the sign-related information R31 acquired by the sign information acquisition process and the auxiliary sign information "beginning" of the sign information M3 are specified and the guidance information is generated so as to cause the vehicle to travel at 50 km, which is the maximum speed information of the sign information M3, and then the guidance information is output to the vehicle control unit 9.

(2) The regulation information "corresponding to regulation" of the sign related information R33 acquired by the sign information acquisition process and the auxiliary sign information "within section" of the sign information M4 are specified and the guidance information is generated which causes the vehicle to travel at 50 km, which is the maximum speed of the sign information M4, based on "within section" of the auxiliary sign information.

(3) The regulation information "corresponding to regulation" of the sign related information R36 acquired by the sign information acquisition process and the auxiliary sign "end" of the sign information M5 are specified and the generation of the guidance information is terminated.

Further, the information control unit 3 (guidance portion 14) may perform the guidance information output process according to the sign type information of the sign information. For example, when the sign type information of the sign information corresponds to a regulation sign, guidance information may be generated so as to cause the vehicle to travel according to the contents of the sign information and the guidance information may be output to the vehicle control unit 9. In addition, when the sign type information of the sign information corresponds to a warning sign, guidance information may be generated for warning a driver according to the contents of the sign information and the guidance information may be output to the vehicle control unit 9.

Also, the information control unit 3 (guidance portion 14) may perform guidance information output processing according to variable type sign information of sign information. For example, when the variable type sign information of the sign information is not a variable type sign, guidance information may be generated so as to cause the vehicle to travel according to the contents of the sign information and the guidance information may be output to the vehicle control unit 9. In addition, when the variable type sign information of the sign information is a variable type sign, generation of the guidance information which causes the vehicle to travel according to the contents of the sign information may not be performed.

It may be configured such that, as the map data 20, the information described in at least two of the first to third embodiments and the modification example is included and all the processes described in at least two of the process of the first embodiment (FIG. 5), the process of the second embodiment (FIG. 5), the process of the third embodiment (FIG. 13), and the process of the modification example is performed using the map data 20. Further, it may be configured such that, as the map data 20, the information described in all of the first to third embodiments and the modification example is included and all the processes described in all of the process of the first embodiment (FIG. 5), the process of the second embodiment (FIG. 5), the process of the third embodiment (FIG. 13), and the process of the modification example is performed using the map data 20.

The technique of determining the lane realized by Patent Literature 1 may not necessarily be a desirable guidance when an image obtained from an imaging device cannot be compared with feature information obtained from a feature information acquiring unit. The embodiments described above solve those problems.

The aspects described in all or a part of the embodiments described above solve any one problem of providing a travel support device capable of appropriately guiding and controlling a moving body and a data structure of map data used for the travel support device; improvement of processing speed; improvement of processing accuracy; improvement of usability; improvement of functions using data or provision of appropriate functions; improvement of other functions or provision of appropriate functions; reduction of data and/or program capacity; provision of data, programs, recording media, devices and/or systems appropriate for downsizing of devices and/or systems; and optimization of production/manufacturing of data, programs, recording media, devices and/or systems, such as reduction of production/manufacturing costs of data, programs, devices or systems, facilitation of production/manufacturing, and shortening of production/manufacturing time.

Although the disclosure has been described in detail and with reference to specific embodiments, it will be apparent to those skilled in the art that various changes and modifications can be made without departing from the spirit and scope of the disclosure.

This application is based on Japanese Patent Application (Application No. 2017-087801) filed on Apr. 27, 2017, the contents of which are incorporated herein by reference.

REFERENCE SIGNS LIST 1 travel support system
2 vehicle
3 information control unit
4 memory unit
5 input unit
6 position acquisition unit
7 vehicle speed information acquisition unit
8 surrounding information acquisition unit
9 vehicle control unit
10 map data acquisition portion
11 route search portion
12 position specifying portion
13 route specifying portion
14 guidance portion
20 map data
30 road network information
31 lane network information
32 feature information
33 related information
LL1 to LL73 lane section information
M1 to M5 sign information
R1 to R38 sign-related information, edge-line-related information

The invention claimed is:

1. A travel support device which supports travel of a vehicle, comprising:
a memory that stores
section information constituting a part of information on a lane including information on a position along a traveling direction of a lane constituting a road and information indicating a connection of lanes, the section information including information on the position along the traveling direction of a predetermined section which is a part of the lane and information indicating a connection with a section adjacent to the predetermined section,
sign information including information indicating a regulation indicated by a sign, the regulation of the sign being applicable to only a vehicle travelling on a forked lane forked from a main lane, and not applicable to a vehicle travelling on the main lane, and
related information associating the section information with the sign information, the related information indicating (1) whether the sign can be used to specify a position of a vehicle traveling at a predetermined point, and (2) whether the regulation indicated by the sign correspond to a regulation on the vehicle traveling at the predetermined point; and
processing circuitry configured to, in response to the vehicle traveling on the main lane,
identify, from the memory, the related information corresponding to the main lane,
determine, based on the related information corresponding to the main lane, that the sign can be used to specify a current location of the vehicle traveling on the main lane, and that the regulation indicated by the sign does not correspond to the regulation on the vehicle traveling on the main lane,
based on the related information corresponding to the main lane, specify the current location of the vehicle using the sign information, the current location being a location of the vehicle in a moving direction of the vehicle, and
based on the related information corresponding to the main lane, guide the vehicle without using the regulation indicated by the sign.

2. The travel support device according to claim 1, wherein the sign information includes height information of the sign from a ground surface.

3. The travel support device according to claim 1, wherein the processing circuitry is configured to guide the vehicle by performing a drive assist.

4. The travel support device according to claim 1, wherein the processing circuitry is configured to identify and store, in the memory, the section information which includes coordinate information corresponding to a point closest to the current location of the vehicle.

5. The travel support device according to claim 1, wherein the processing circuitry is configured to identify and store, in the memory, the sign information based on the current location of the vehicle.

6. The travel support device according to claim 1, wherein the sign information includes information indicating a shape of the sign.

7. The travel support device according to claim 6, wherein the processing circuitry is configured to:
acquire, from an imaging device, a surrounding image of the vehicle; and
compare the acquired surrounding image with the shape of the sign indicated by the sign information to extract an image area of the sign.

8. The travel support device according to claim 7, wherein the processing circuitry is configured to specify the current location of the vehicle by calculating a relative distance between the vehicle and the sign based on the extracted image area of the sign.

* * * * *